United States Patent
Nozu et al.

(10) Patent No.: US 10,480,597 B2
(45) Date of Patent: Nov. 19, 2019

(54) CLUTCH APPARATUS AND METHOD FOR CONTROLLING THE CLUTCH APPARATUS

(71) Applicant: JTEKT CORPORATION, Osaka-shi (JP)

(72) Inventors: Tomohiro Nozu, Anjo (JP); Yuta Takeuchi, Okazaki (JP); Tsutomu Matsumoto, Anjo (JP); Shotaro Niimi, Kariya (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 16/001,348

(22) Filed: Jun. 6, 2018

(65) Prior Publication Data

US 2018/0355929 A1 Dec. 13, 2018

(51) Int. Cl.
*F16D 28/00* (2006.01)
*F16D 48/06* (2006.01)
*B60K 17/02* (2006.01)
*B60K 17/34* (2006.01)
*F16D 13/52* (2006.01)
*F16D 25/0638* (2006.01)
(Continued)

(52) U.S. Cl.
CPC .......... *F16D 48/066* (2013.01); *B60K 17/02* (2013.01); *B60K 17/34* (2013.01); *B60K 17/344* (2013.01); *B60K 17/3515* (2013.01); *B60K 23/0808* (2013.01); *F16D 13/52* (2013.01); *F16D 25/0638* (2013.01); *F16D 25/083* (2013.01); *F16D 25/14* (2013.01); *F16D 28/00* (2013.01); *F16H 25/12* (2013.01); *B60K 2023/0816* (2013.01); *B60Y 2400/424* (2013.01); *F16D 2048/0227* (2013.01); *F16D 2048/0251* (2013.01); *F16D 2500/1024* (2013.01)

(58) Field of Classification Search
CPC ................ F16D 2048/0251; F16D 2048/0227
See application file for complete search history.

(56) References Cited

U.S. PATENT DOCUMENTS

| | | | |
|---|---|---|---|
| 2004/0231946 A1* | 11/2004 | Neelakantan | F16D 23/12 192/84.6 |
| 2009/0045028 A1* | 2/2009 | Neelakantan | F16D 25/0638 192/85.48 |

(Continued)

FOREIGN PATENT DOCUMENTS

JP 2006-97886 4/2006

*Primary Examiner* — Justin Holmes
(74) *Attorney, Agent, or Firm* — Oblon, McClelland, Maier & Neustadt, L.L.P.

(57) ABSTRACT

A clutch apparatus includes a clutch hub, a clutch drum, a multi-plate clutch having inner clutch plates and outer clutch plates, a piston for pressing the multi-plate clutch, an electric motor, a moving mechanism for moving the piston in an axial direction in accordance with the amount of rotation of the electric motor, and a control unit for controlling the electric motor. When increasing a rotational force that is transmitted between the clutch hub and the clutch drum by increasing electric current that is supplied to the electric motor, the control unit moves the piston in the axial direction by temporarily supplying the electric motor with the electric current having a first current value that is greater than a second current value corresponding to a target rotational force that needs to be transmitted between the clutch hub and the clutch drum.

7 Claims, 19 Drawing Sheets

(51) Int. Cl.
*F16H 25/12* (2006.01)
*F16D 25/08* (2006.01)
*F16D 48/02* (2006.01)
*B60K 17/344* (2006.01)
*B60K 17/35* (2006.01)
*B60K 23/08* (2006.01)

(56) References Cited

U.S. PATENT DOCUMENTS

| 2014/0163831 A1* | 6/2014 | Kodama | F16D 23/12 |
| | | | 701/68 |
| 2016/0040731 A1* | 2/2016 | Fukunaga | F16D 48/02 |
| | | | 192/85.63 |
| 2016/0341265 A1* | 11/2016 | Heubner | F16D 25/12 |

* cited by examiner

CLUTCH APPARATUS AND METHOD FOR CONTROLLING THE CLUTCH APPARATUS

INCORPORATION BY REFERENCE

The disclosure of Japanese Patent Application No. 2017-114904 filed on Jun. 12, 2017 including the specification, drawings and abstract, is incorporated herein by reference in its entirety.

BACKGROUND OF THE INVENTION

1. Field of the Invention

The invention relates to a clutch apparatus that allows adjustment of a rotational force that is transmitted between rotating members rotatable relative to each other, and also relates to a method for controlling the clutch apparatus.

2. Description of Related Art

There is a clutch apparatus that allows adjustment of a rotational force that is transmitted between rotating members rotatable relative to each other. As disclosed in, for example, Japanese Patent Application Publication No. 2006-97886 (JP 2006-97886 A), such a clutch apparatus may be used in a drive force transmission path to auxiliary drive wheels in four-wheel drive vehicles.

A clutch apparatus (a torque transmission apparatus) disclosed in JP 2006-97886 A includes the following: a clutch outer case and a clutch hub that share an axis of rotation and are rotatable relative to each other about the axis; a multi-plate clutch located between the clutch outer case and the clutch hub; a cam mechanism that converts a rotational output of an electric motor to an axial thrust force; and a pressing plate that presses the multi-plate clutch by receiving the thrust force from the cam mechanism. The clutch outer case is coupled to a drive pinion gear that meshes with a ring gear of a rear differential device. The clutch hub is coupled to a rotating shaft coupled to a propeller shaft. When the cam mechanism operates by the rotation of the electric motor, the pressing plate receives the thrust force and presses the multi-plate clutch, thereby transmitting a rotational force from the clutch hub to the clutch outer case.

To improve responsiveness when the multi-plate clutch is pressed by the rotation of the electric motor, the clutch apparatus disclosed in JP 2006-97886 A further includes the following: a coil spring that exerts a biasing force to eliminate clearances in the multi-plate clutch; and a movable member that transmits the biasing force to the cam mechanism.

When a clutch apparatus that is operated by the rotation of an electric motor is used, for example, in a drive force transmission path of a vehicle as described above, high responsiveness is required to quickly transmit a target rotational force appropriate to a vehicle traveling state, to the downstream side of the drive force transmission path through a multi-plate clutch. One possible approach to quickly press the multi-plate clutch so as to improve the responsiveness may be to rotate the electric motor at higher angular accelerations and at higher speeds. However, rotating the electric motor in such a manner may cause overshoot of a rotational force transmitted through the multi-plate clutch, so that the rotational force transmitted to the downstream side of the drive force transmission path may temporarily exceed the target rotational force. Such overshoot may adversely affect the behavior of a vehicle as well as the durability of parts located on the downstream side of the drive force transmission path, such as a differential device and drive shafts.

Using a biasing member to eliminate clearances in the multi-plate clutch, as in the clutch apparatus disclosed in JP 2006-97886 A, may improve responsiveness when the clutch apparatus operates. However, according to this approach, in a non-operating state where the electric motor generates no torque, the rotational force is transmitted to the downstream side of the drive force transmission path due to drag torque of the multi-plate clutch.

SUMMARY OF THE INVENTION

A purpose of the invention is to provide a clutch apparatus and a method for controlling the clutch apparatus that improve responsiveness when the clutch apparatus operates, while suppressing drag torque of a multi-plate clutch and overshoot of a rotational force.

An aspect of the invention provides a clutch apparatus including the following: a first rotating member and a second rotating member that share an axis of rotation and that are rotatable relative to each other about the axis; a multi-plate clutch having a first clutch plate that rotates together with the first rotating member, and a second clutch plate that is aligned with the first clutch plate in an axial direction and that rotates together with the second rotating member; a pressing member that presses the multi-plate clutch; an electric motor that is supplied with electric current and that generates torque in accordance with the electric current; a moving mechanism that moves the pressing member in the axial direction in accordance with the amount of rotation of the electric motor; and a control unit that controls the electric motor. The clutch apparatus adjusts a rotational force that is transmitted between the first rotating member and the second rotating member through the multi-plate clutch. When increasing the rotational force transmitted between the first rotating member and the second rotating member by increasing the electric current supplied to the electric motor, the control unit moves the pressing member in the axial direction by temporarily supplying the electric motor with the electric current having a first current value that is greater than a second current value corresponding to a target rotational force that needs to be transmitted between the first rotating member and the second rotating member.

According to the above aspect, the clutch apparatus makes it possible to improve responsiveness when the clutch apparatus operates, while suppressing drag torque of the multi-plate clutch and overshoot of the rotational force.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
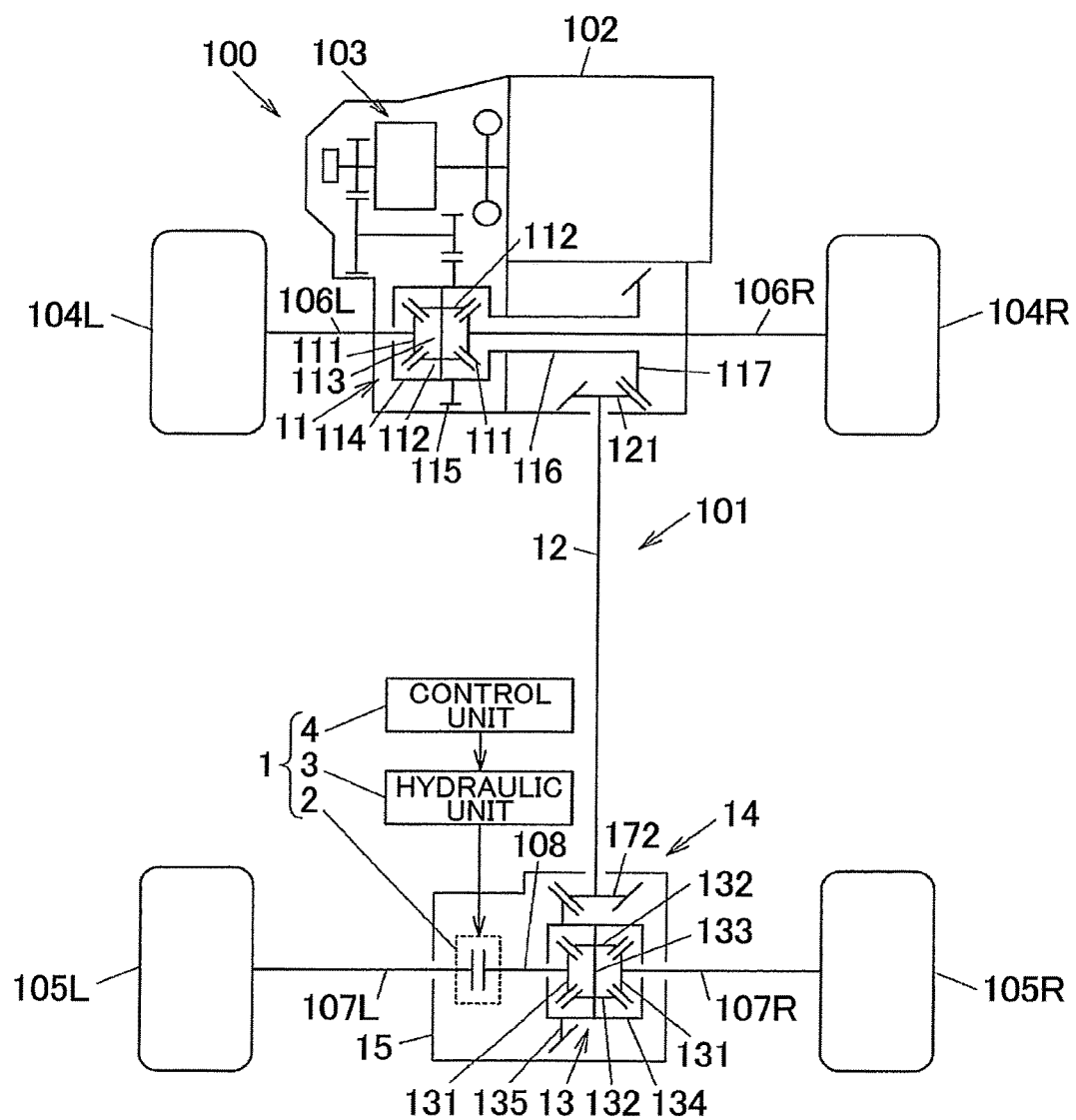
FIG. 1 is a schematic diagram illustrating an example of the structure of a four-wheel drive vehicle equipped with a drive force transmission control apparatus according to a first embodiment of the invention.

A first embodiment of the invention is described with reference to FIGS. 1 to 8. FIG. 1 is a schematic diagram illustrating an example of the structure of a four-wheel drive vehicle 100 equipped with a drive force transmission control apparatus 1 according to a first embodiment of the invention.

The four-wheel drive vehicle 100 includes the following: an engine 102 as a drive source for generating a drive force that the four-wheel drive vehicle 100 uses to travel; a transmission 103; right and left front wheels 104R and 104L as a pair of main drive wheels; right and left rear wheels 105R and 105L as a pair of auxiliary drive wheels; and a drive force transmission system 101 that selectively transmits the drive force of the engine 102 to the front wheels 104R and 104L and the rear wheels 105R and 105L. The four-wheel drive vehicle 100 is switchable between a four-wheel drive mode and a two-wheel drive mode. The four-wheel drive mode transmits the drive force of the engine 102 to the front wheels 104R and 104L, and also to the rear wheels 105R and 105L. The two-wheel drive mode transmits the drive force of the engine 102 to only the front wheels 104R and 104L. Throughout the first embodiment, the notations "R" and "L" in reference numerals are respectively used to denote the right side and the left side of the four-wheel drive vehicle 100.

The drive force transmission system 101 includes the following: the drive force transmission control apparatus 1 as one aspect of a clutch apparatus according to the invention; a front differential 11; a propeller shaft 12; a rear differential 13; front drive shafts 106R and 106L; and rear drive shafts 107R and 107L. The drive force of the engine 102 is always transmitted to the front wheels 104R and 104L. The drive force of the engine 102 is transmitted to the rear wheels 105R and 105L through a rear drive force distribution mechanism 14 that includes the rear differential 13 and a clutch unit 2 of the drive force transmission control apparatus 1. The drive force distribution mechanism 14 allows the drive force of the engine 102 to be selectively and differentially distributed to the right and left rear wheels 105R and 105L.

The front differential 11 includes the followings: a pair of side gears 111 each coupled to a corresponding one of the front drive shafts 106R and 106L; a pair of pinion gears 112 that mesh with the pair of side gears 111 with their gear axes perpendicular to each other; a pinion gear shaft 113 that supports the pair of pinion gears 112; a front differential case 114 that houses the pair of side gears 111, the pair of pinion gears 112, and the pinion gear shaft 113; and a ring gear 115 fixed to the outside of the front differential case 114. The drive force of the engine 102 is changed in speed by the transmission 103 and is then input to the front differential case 114 through the ring gear 115.

The propeller shaft 12 receives the torque of the engine 102 through the front differential case 114 and transmits the torque to the drive force distribution mechanism 14. A front end of the propeller shaft 12 is provided with a pinion gear 121. The pinion gear 121 is in mesh with a ring gear 117 that is coupled and fixed by a cylindrical portion 116 to the front differential case 114.

As in the front differential 11, the rear differential 13 includes a pair of side gears 131, a pair of pinion gears 132, a pinion gear shaft 133, a rear differential case 134, and a ring gear 135. One of the pair of side gears 131 is coupled to the drive shaft 107R and is not rotatable relative to the drive shaft 107R. The other of the pair of side gears 131 is coupled to an intermediate shaft 108 and is not rotatable relative to the intermediate shaft 108.

The clutch unit 2 of the drive force transmission control apparatus 1 is located between the intermediate shaft 108 and the drive shaft 107L. The clutch unit 2 allows adjustment of the drive force that is transmitted from the intermediate shaft 108 to the drive shaft 107L. As much drive force as the clutch unit 2 transmits is transmitted to the drive shaft 107R through the rear differential 13. When the four-wheel drive vehicle 100 travels in a disengaged state where the clutch unit 2 does not transmit the drive force, the pair of pinion gears 132 spin idly so that no drive force is transmitted to the drive shafts 107R and 107L.

The drive force transmission control apparatus 1 includes the clutch unit 2, a hydraulic unit 3, and a control unit 4 that controls the hydraulic unit 3. Details of the drive force transmission control apparatus 1 are described later.

Figure 2:
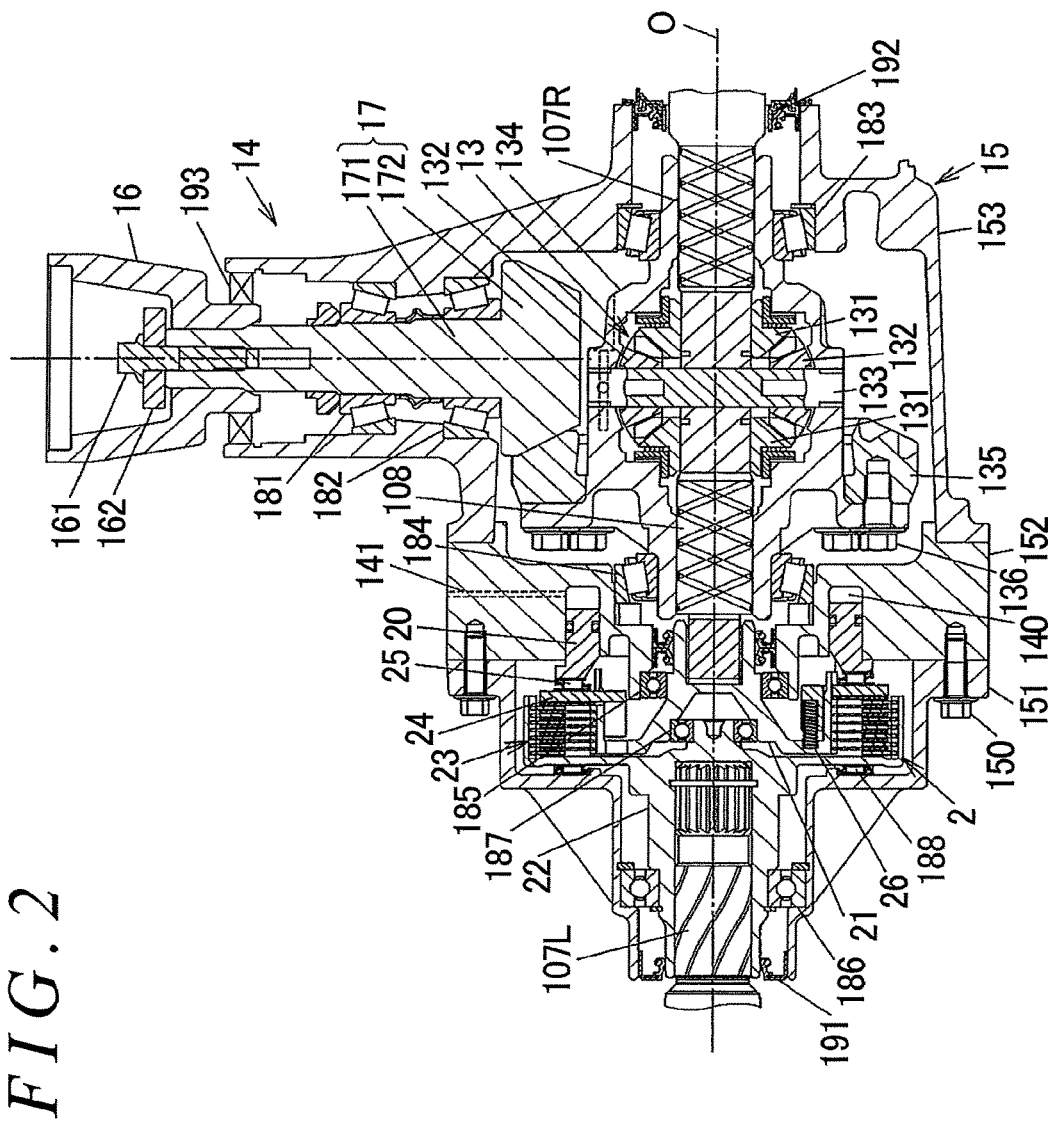
FIG. 2 is a cross-sectional view illustrating an example of the structure of a drive force distribution mechanism of the drive force transmission control apparatus.
Figure 3:
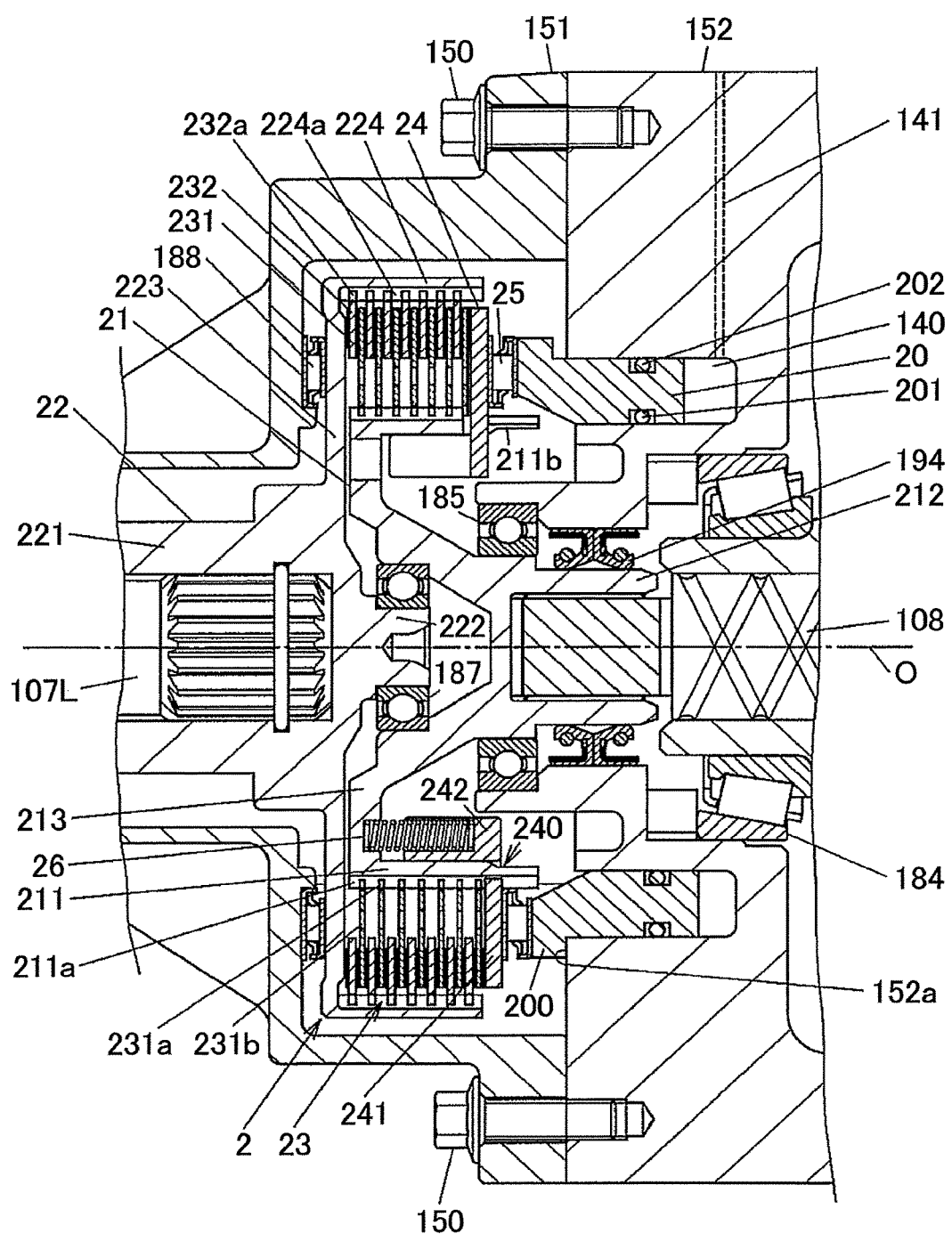
FIG. 3 is a partial enlarged view of FIG. 2.

FIG. 2 is a cross-sectional view illustrating an example of the structure of the drive force distribution mechanism 14. FIG. 3 is a partial enlarged view of FIG. 2.

The drive force distribution mechanism 14 includes the following: the rear differential 13; the clutch unit 2; a differential carrier 15 supported on a vehicle body; a coupling member 16 to which the propeller shaft 12 is coupled; a pinion gear shaft 17 that rotates together with the coupling member 16; and the intermediate shaft 108.

The coupling member 16 and the pinion gear shaft 17 are coupled together by a bolt 161 and a washer 162. The pinion gear shaft 17 includes a shaft portion 171 and a gear portion 172. The shaft portion 171 is supported by a pair of tapered roller bearings 181 and 182 such that the shaft portion 171 is rotatable. The gear portion 172 is in mesh with the ring gear 135. The ring gear 135 is fixed by multiple bolts 136 to the rear differential case 134 and is thus rotatable together with the rear differential case 134. The rear differential case 134 is rotatably supported on the differential carrier 15 by a pair of tapered roller bearings 183 and 184.

The differential carrier 15 includes the following: a first carrier member 151 that houses the clutch unit 2; a third carrier member 153 that houses the rear differential 13 and the pinion gear shaft 17; and a second carrier member 152 that is located between the first carrier member 151 and the third carrier member 153. The first carrier member 151 and the second carrier member 152 are bolted together. The second carrier member 152 and the third carrier member 153 are bolted together. For example, as illustrated in FIGS. 2 and 3, the first carrier member 151 and the second carrier member 152 are coupled together by multiple bolts 150.

The first carrier member 151 houses one end of the drive shaft 107L. The third carrier member 153 houses one end of the drive shaft 107R. A sealing member 191 fits in an opening of the first carrier member 151 that the drive shaft 107L is inserted through. A sealing member 192 fits in an opening of the third carrier member 153 that the drive shaft 107R is inserted through. The third carrier member 153 houses one end of the coupling member 16. A sealing member 193 is located between the coupling member 16 and the third carrier member 153.

The clutch unit 2 includes the following: a piston 20 that serves as a pressing member and that is moved by the pressure of hydraulic oil (a hydraulic fluid) supplied from the hydraulic unit 3; a clutch hub 21 that serves as a first rotating member and that rotates together with the intermediate shaft 108; a clutch drum 22 that serves as a second rotating member and that rotates together with the drive shaft 107L; a multi-plate clutch 23 that is located between the clutch hub 21 and the clutch drum 22; a pressure plate 24 and a thrust roller bearing 25 that are located between the piston 20 and the multi-plate clutch 23; and return springs 26 that are located between the clutch hub 21 and the pressure plate 24. The clutch hub 21 and the clutch drum 22 share an axis O of rotation and are rotatable relative to each other on the rotation axis O.

As illustrated in FIG. 3, the multi-plate clutch 23 includes the following: inner clutch plates 231 that serve as multiple first clutch plates and that rotate together with the clutch hub 21; and outer clutch plates 232 that serve as multiple second clutch plates and that rotate together with the clutch drum 22. Frictional sliding between the inner clutch plates 231 and the outer clutch plates 232 is lubricated by lubricating oil (not illustrated). The inner clutch plates 231 alternate with the outer clutch plates 232 in the axial direction.

When the multi-plate clutch 23 receives a pressing force from the piston 20 through the pressure plate 24 and the thrust roller bearing 25, a frictional force is generated between the inner clutch plates 231 and the outer clutch plates 232. The frictional force transmits a rotational force between the clutch hub 21 and the clutch drum 22. The axial movement of the piston 20 along the rotation axis O presses the multi-plate clutch 23.

The clutch hub 21 integrally includes a cylindrical portion 211, a bottomed cylindrical coupling portion 212, and a connecting portion 213. The cylindrical portion 211 has an outer circumferential surface provided with a spline engagement portion 211a having multiple spline projections extending in the axial direction. The coupling portion 212 is smaller in diameter than the cylindrical portion 211 and is splined to the intermediate shaft 108. The connecting portion 213 connects the cylindrical portion 211 and the coupling portion 212. A sealing member 194 that is supported by the second carrier member 152 is in sliding contact with the outer circumferential surface of the coupling portion 212. The sealing member 194 separates a space that houses the clutch unit 2 from a space that houses the rear differential 13.

The pressure plate 24 has an insertion opening 240 through which a projection 211b formed at an end of the cylindrical portion 211 of the clutch hub 21 is inserted. The pressure plate 24 is not rotatable relative to the clutch hub 21 and is movable in the axial direction relative to the clutch hub 21. The pressure plate 24 includes the following: a pressing portion 241 that is located radially outside the cylindrical portion 211 of the clutch hub 21 and that presses the multi-plate clutch 23; and an inner wall portion 242 located radially inside the cylindrical portion 211. The insertion opening 240 is formed between the pressing portion 241 and the inner wall portion 242. The return springs 26 are located between the inner wall portion 242 of the pressure plate 24 and the connecting portion 213 of the clutch hub 21 while being compressed in the axial direction. In FIGS. 2 and 3, one of the return springs 26 is illustrated. The return springs 26 are coil springs and bias the pressure plate 24 toward the piston 20.

As illustrated in FIG. 3, the clutch drum 22 integrally includes the following: a coupling portion 221 that the drive shaft 107L is coupled to; a boss portion 222 protruding in the axial direction from an end of the coupling portion 221 that faces the clutch hub 21; an annular wall portion 223 extending radially outward from the coupling portion 221; and a cylindrical portion 224 extending in the axial direction from a radially outer end of the wall portion 223.

The multi-plate clutch 23 is located between the cylindrical portion 211 of the clutch hub 21 and the cylindrical portion 224 of the clutch drum 22. Each of the inner clutch plates 231 has an inner edge provided with multiple projections 231a that engage with the spline engagement portion 211a of the cylindrical portion 211 of the clutch hub 21. Thus, the inner clutch plates 231 are coupled to the clutch hub 21 such that the inner clutch plates 231 are movable in the axial direction relative to the clutch hub 21 and are not rotatable relative to the clutch hub 21. Each of the outer clutch plates 232 has an outer edge provided with multiple projections 232a that engage with a spline engagement portion 224a formed on the inner circumferential surface of the cylindrical portion 224 of the clutch drum 22. Thus, the outer clutch plates 232 are coupled to the clutch drum 22 such that the outer clutch plates 232 are movable in the axial direction relative to the clutch drum 22 and are not rotatable relative to the clutch drum 22.

The clutch hub 21 is supported by a ball bearing 185 that is attached to the second carrier member 152. The clutch drum 22 is supported by a ball bearing 186 that is located between the coupling portion 221 and the first carrier member 151. A ball bearing 187 is located between the clutch hub 21 and the outer circumferential surface of the boss portion 222 of the clutch drum 22. A thrust roller bearing 188 is located between the wall portion 223 of the clutch drum 22 and the inner surface of the first carrier member 151.

The second carrier member 152 has an annular cylinder chamber 140 and a hydraulic oil supply hole 141. The annular cylinder chamber 140 is supplied through the hydraulic oil supply hole 141 with hydraulic oil that applies hydraulic pressure to the piston 20 so as to move the piston 20 toward the multi-plate clutch 23. The cylinder chamber 140 is circular ring-shaped and has a central axis that coincides with the rotation axis O.

The cylinder chamber 140 is supplied through the hydraulic oil supply hole 141 with the hydraulic oil from the hydraulic unit 3. The piston 20 is reciprocatable in the axial direction with its axial end partially remaining within the cylinder chamber 140. The piston 20 presses the multi-plate clutch 23 using the hydraulic pressure of the hydraulic oil supplied to the cylinder chamber 140, thereby bringing the inner clutch plates 231 and the outer clutch plates 232 in frictional contact with each other.

When the pressure of the hydraulic oil in the cylinder chamber 140 falls, the piston 20 moves toward the bottom of the cylinder chamber 140 by receiving the biasing force of the return springs 26 through the pressure plate 24, thus forming a distance between the multi-plate clutch 23. An O-ring 201 is held in a circumferential groove formed in the inner circumferential surface of the piston 20. An O-ring 202 is held in a circumferential groove formed in the outer circumferential surface of the piston 20. The O-rings 201 and 202 separate the hydraulic oil used to move the piston 20 from the lubricating oil used to lubricate the multi-plate clutch 23 so as not to allow these oils to mix with each other. The axial position of the piston 20 is where the pressure of the hydraulic oil in the cylinder chamber 140 that the piston 20 receives balances with the sum of the biasing force of the return springs 26 and the reaction force from the multi-plate clutch 23 that the piston 20 receives.

The piston 20 has an engagement protrusion 200 that is located outside the cylinder chamber 140 and that protrudes radially outward. When the pressure in the cylinder chamber 140 is low, the biasing force of the return springs 26 moves the piston 20 and brings the engagement protrusion 200 into abutment with an engagement surface 152a of the second carrier member 152 that is located around an opening of the cylinder chamber 140. The position of the piston 20 when the engagement protrusion 200 abuts with the engagement surface 152a is hereinafter referred to as an initial position. In FIGS. 2 and 3, a lower area below the rotation axis O illustrates a state where the piston 20 is in the initial position.

Figure 4A:
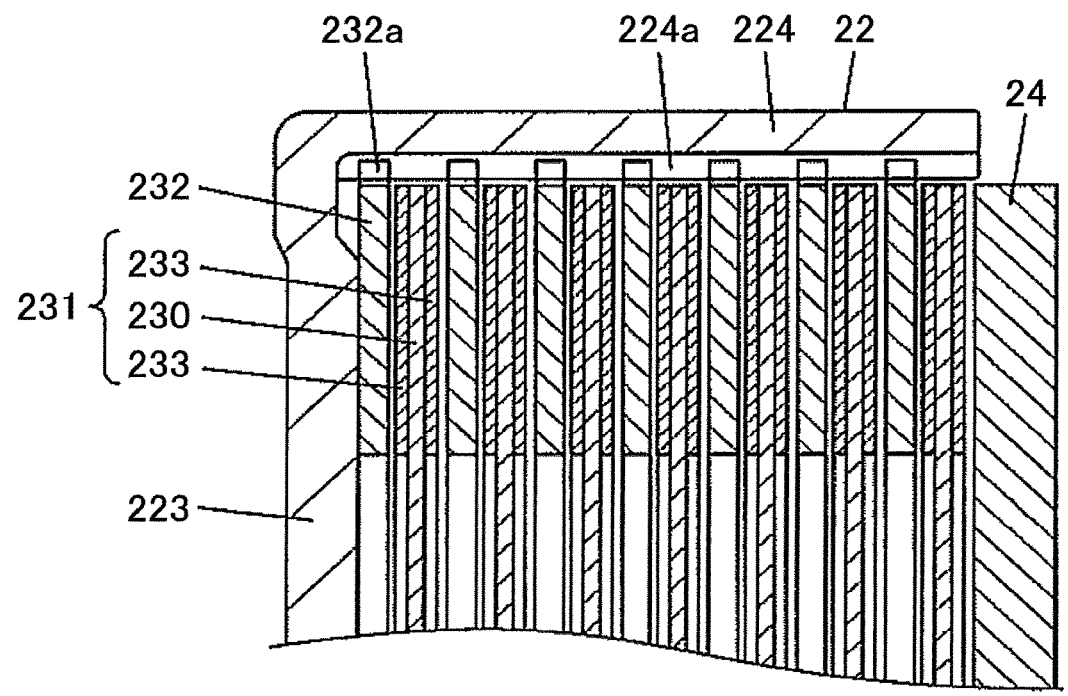
FIGS. 4A to 4C are enlarged views partially illustrating a multi-plate clutch and its surrounding area.
Figure 4B:
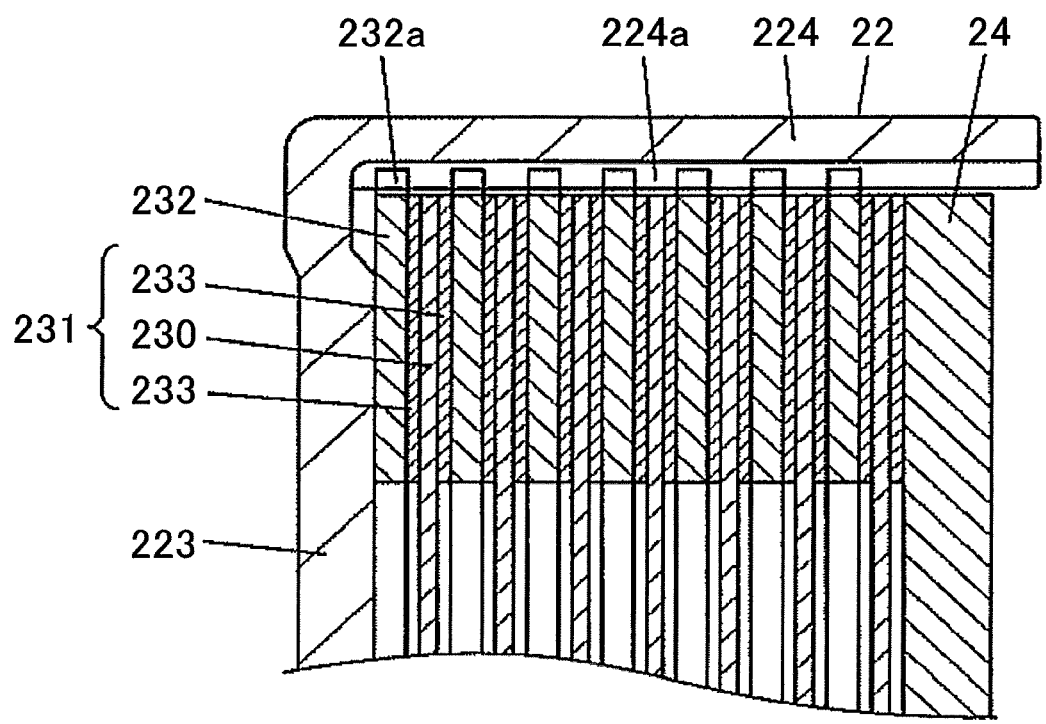
Figure 4C:
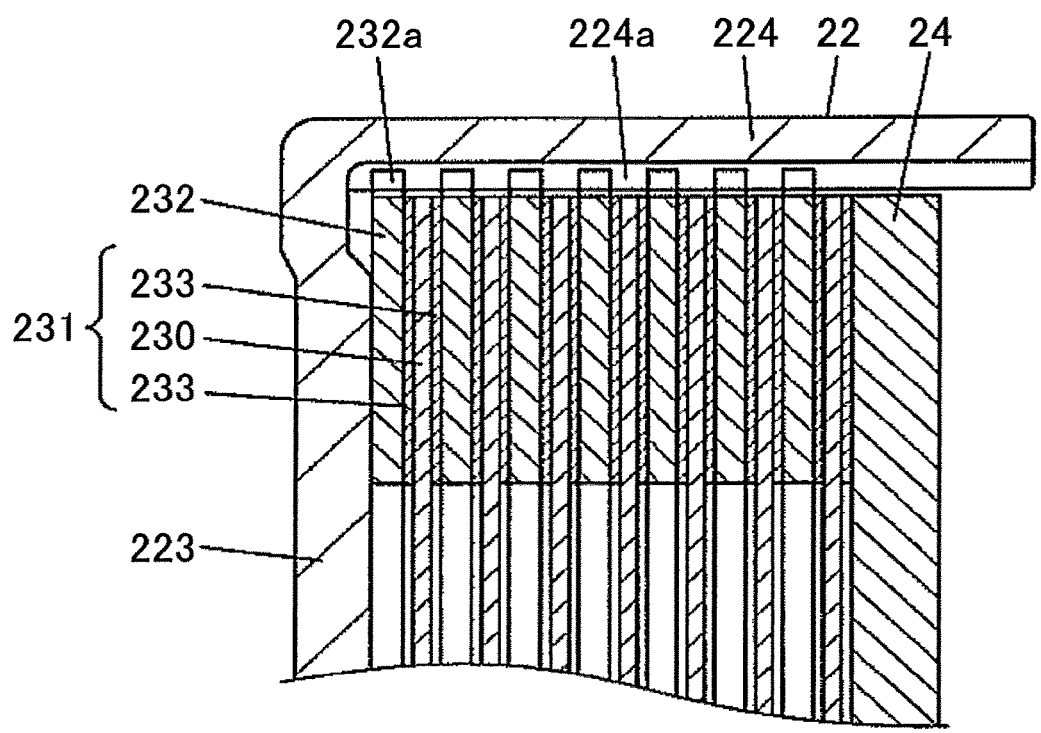

FIGS. 4A to 4C are enlarged views partially illustrating the multi-plate clutch 23 and its surrounding area. FIG. 4A shows a state where the piston 20 is in the initial position. FIG. 4B shows a state where clearances between the inner clutch plates 231 and the outer clutch plates 232 are eliminated. FIG. 4C shows a state where the piston 20 is further moved from the state shown in FIG. 4B and presses the inner clutch plates 231 and the outer clutch plates 232 against each other.

Each of the inner clutch plates 231 includes an annular base 230 formed from a metal plate, and a friction member 233 bonded on each side of the base 230. The friction member 233 may be, for example, formed from paper friction material or non-woven fabric material, and is bonded on the base 230 such that the friction member 233 faces an adjacent one of the outer clutch plates 232. The base 230 may be, for example, made of iron-based metal and has a flow hole 231b (refer to FIG. 3) that the lubricating oil flows through and that is located radially inside the friction member 233. Each of the outer clutch plates 232 may be, for example, an annular plate made of iron-based metal, as with the base 230, and has an oil groove (not illustrated) on its surface.

As illustrated in FIG. 4A, in an initial state where the piston 20 is in the initial position, there are clearances between the inner clutch plates 231 and the outer clutch plates 232, specifically, between the friction members 233 of the inner clutch plates 231, and the outer clutch plates 232. The lubricating oil fills the clearances, thus allowing relative rotation between the clutch hub 21 and the clutch drum 22.

As illustrated in FIG. 4B, when the piston 20 is moved from the initial position, and all the clearances between the inner clutch plates 231 and the outer clutch plates 232 are eliminated, almost all the lubricating oil is pushed out from between the inner clutch plates 231 and the outer clutch plates 232. In this state, although the inner clutch plates 231 (the friction members 233) and the outer clutch plates 232 may be in contact with each other such that drag torque due to the viscosity of the lubricating oil is transmittable between the clutch hub 21 and the clutch drum 22, there is no transmission of rotational force that is caused by frictional contact between the inner clutch plates 231 and the outer clutch plates 232.

When the piston 20 is further moved after the clearances in the multi-plate clutch 23 are eliminated as described above, the friction members 233 of the inner clutch plates 231 are compressed as illustrated in FIG. 4C. This brings the inner clutch plates 231 and the outer clutch plates 232 into frictional contact with each other, thereby transmitting a rotational force between the clutch hub 21 and the clutch drum 22. Thus, the four-wheel drive vehicle 100 switches to the four-wheel drive mode.

Figure 5:
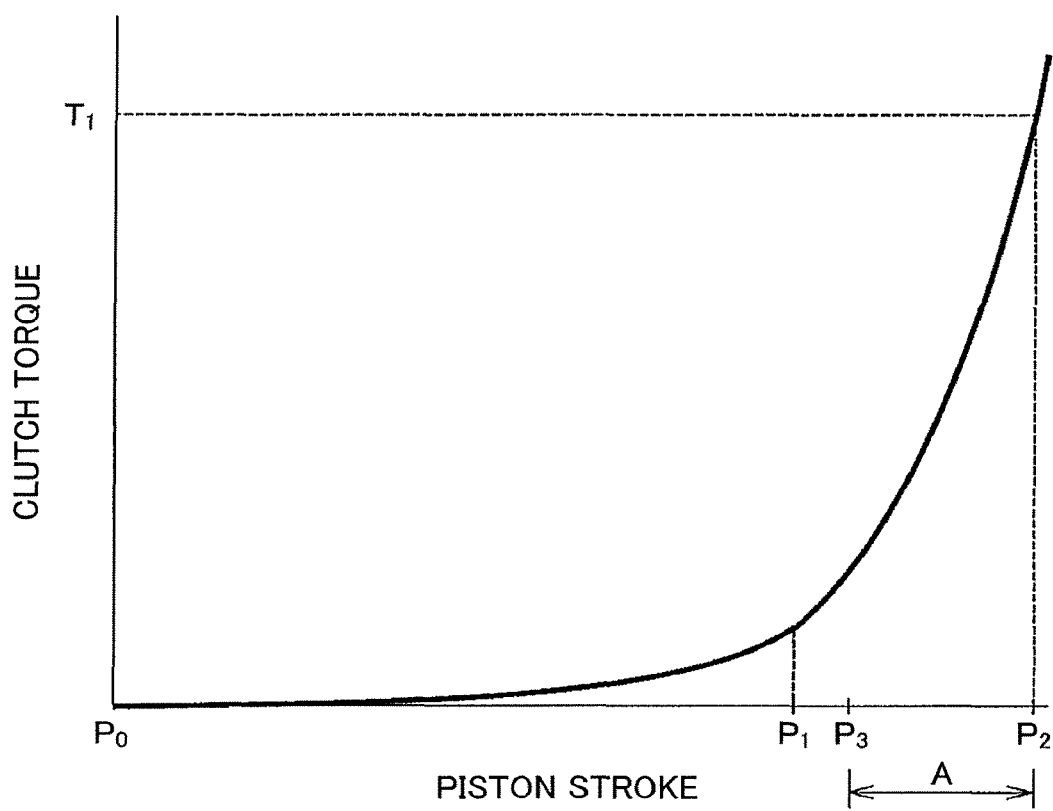
FIG. 5 is a graph illustrating an example of the relationship between the amount of movement of a piston from its initial position and a rotational force transmitted through the multi-plate clutch.

FIG. 5 is a graph illustrating an example of the relationship between the amount of movement (a piston stroke) of the piston 20 from the initial position and the rotational force (clutch torque) that is transmitted between the clutch hub 21 and the clutch drum 22 through the multi-plate clutch 23. The relationship between the piston stroke and the clutch torque is determined by prior experiments and is prestored in a later-described memory device 41 of the control unit 4.

In this graph, a value $P_0$ on the horizontal axis that represents the piston stroke corresponds to the initial position of the piston 20, and a value $P_1$ corresponds to a position of the piston 20 when the clearances in the multi-plate clutch 23 are eliminated as illustrated in FIG. 4B. The clutch torque gradually changes when the piston stroke is less than or equal to the value $P_1$ and sharply increases when the piston stroke exceeds the value $P_1$.

Figure 6:
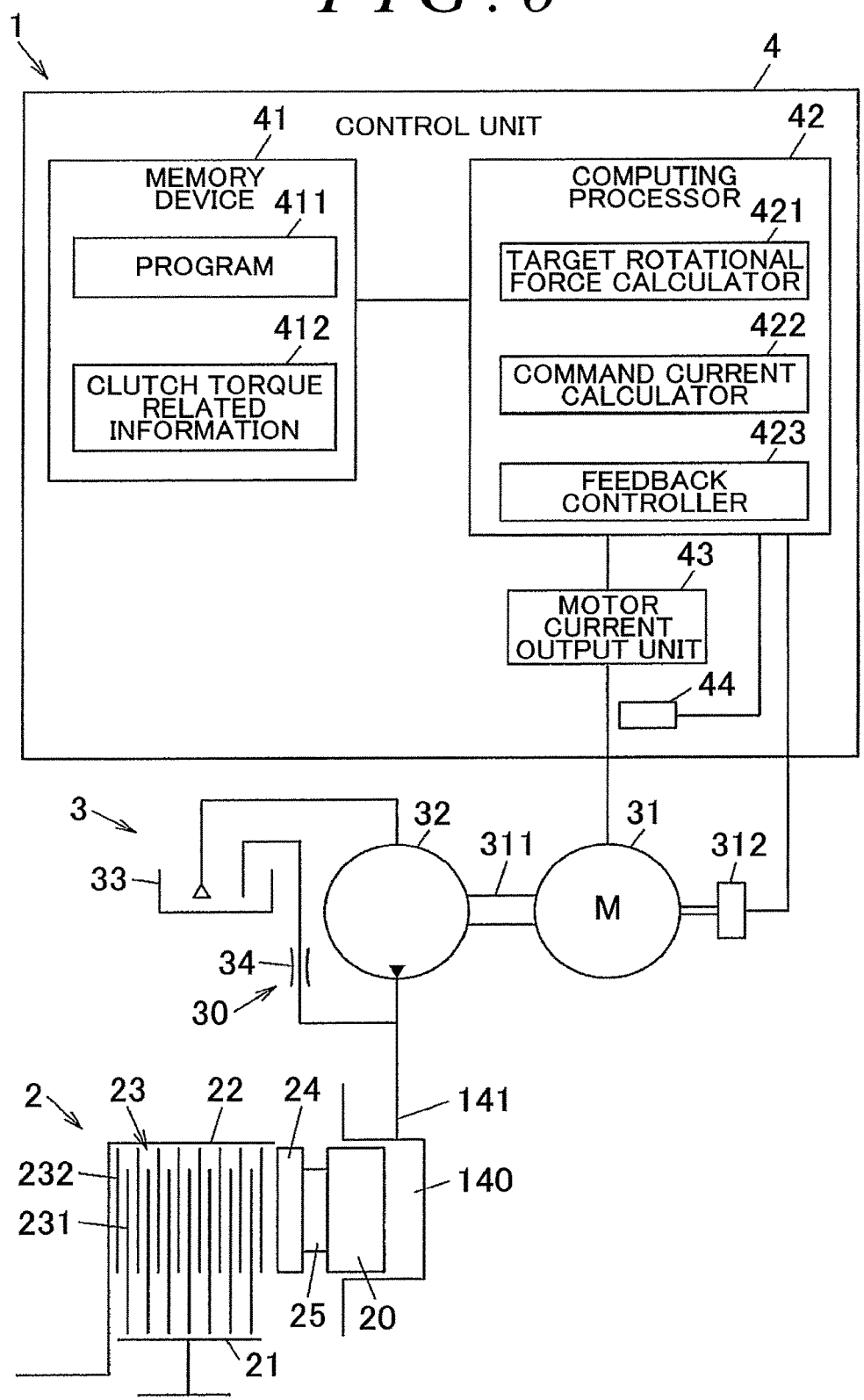
FIG. 6 is a schematic diagram illustrating the structure of a clutch unit, a hydraulic unit, and a control unit of the drive force transmission control apparatus.

FIG. 6 is a schematic diagram illustrating the structure of the clutch unit 2, the hydraulic unit 3, and the control unit 4 of the drive force transmission control apparatus 1. The hydraulic unit 3 includes the following: an electric motor 31 that is supplied with electric current and that generates torque in accordance with the supplied current; a hydraulic pump 32 that is driven by the electric motor 31; a fixed throttle valve 34 that returns, to a reservoir 33, part of hydraulic oil discharged from the hydraulic pump 32. The electric motor 31 and the hydraulic pump 32 are coupled together by a coupling shaft 311. The electric motor 31 may be, for example, a three-phase brushless direct current (DC) motor. Alternatively, the electric motor 31 may be a brush DC motor.

The control unit 4 supplies motor current to the electric motor 31 to control the electric motor 31. By adjusting torque generated by the electric motor 31, the drive force transmission control apparatus 1 adjusts a rotational force (a drive force) that is transmitted between the clutch hub 21 and the clutch drum 22 through the multi-plate clutch 23.

The hydraulic pump 32 has a common structure. The hydraulic pump 32 draws, from the reservoir 33, an amount of hydraulic oil corresponding to the amount of rotation of the electric motor 31 and discharges the hydraulic oil. The fixed throttle valve 34 returns, to the reservoir 33, an amount of hydraulic oil corresponding to a discharge pressure of the hydraulic pump 32. The hydraulic pump 32 may be, for example, an external gear pump, an internal gear pump, or a vane pump. According to the first embodiment, the hydraulic pump 32 and the fixed throttle valve 34 form a moving mechanism 30 that moves the piston 20 in the axial direction in accordance with the amount of rotation of the electric motor 31. The moving mechanism 30 moves the piston 20 toward the multi-plate clutch 23 by the pressure in the cylinder chamber 140 that is supplied with the hydraulic oil discharged from the hydraulic pump 32.

The electric motor 31 is provided with a rotation amount sensor 312 for detecting the amount of rotation of the coupling shaft 311. The rotation amount sensor 312 outputs, to the control unit 4, a pulse signal having a pulse width corresponding to the rotational speed of the coupling shaft 311. By cumulatively counting the pulse signal output from the rotation amount sensor 312, the control unit 4 measures the amount of rotation of the coupling shaft 311, i.e., the amount of rotation of the hydraulic pump 32, from the initial state where the piston 20 is in the initial positon. The amount of movement of the piston 20 from the initial position is proportional to the amount of rotation of the electric motor 31, i.e., the amount of rotation of the hydraulic pump 32, from the initial state.

The control unit 4 includes the following: a semiconductor memory device 41; a computing processor 42, such as a central processing unit (CPU), that executes a program 411 stored in the memory device 41; a motor current output unit 43 that has switching elements, such as power transistors; and a current sensor 44 that detects the motor current supplied from the motor current output unit 43 to the electric motor 31. The switching elements of the motor current output unit 43 are switched ON and OFF in response to a pulse width modulation (PWM) signal that is output from the computing processor 42. The computing processor 42 changes the duty ratio of the PWM signal in accordance with how much motor current needs to be supplied to the electric motor 31.

By executing the program 411, the computing processor 42 functions as a target rotational force calculator 421, a command current calculator 422, and a feedback controller 423. The target rotational force calculator 421 calculates, on the basis of traveling conditions of the four-wheel drive vehicle 100, a target rotational force that needs to be transmitted between the clutch hub 21 and the clutch drum 22. The command current calculator 422 calculates a command current value indicating the value of electric current that needs to be supplied to the electric motor 31. The feedback controller 423 calculates a duty ratio that allows electric current having the command current value to be supplied to the electric motor 31 and outputs a PWM signal with the duty ratio to the motor current output unit 43.

The target rotational force calculator 421 sets the target rotational force to a larger value, for example, as the amount by which a driver depresses an accelerator pedal increases or as a differential rotational speed that is a difference between the average rotational speed of the front wheels 104R and 104L and the average rotational speed of the rear wheels 105R and 105L increases. The feedback controller 423 increases the duty ratio when an actual current value detected by the current sensor 44 is less than the command current value, and decreases the duty ratio when the actual current value is greater than the command current value.

After the four-wheel drive vehicle 100 switches to the four-wheel drive mode, the command current calculator 422 sets the command current value to a current value corresponding to the target rotational force calculated by the target rotational force calculator 421. During a transition from the two-wheel drive mode to the four-wheel drive mode, the command current calculator 422 sets the command current value to a current value that is greater than the current value corresponding to the target rotational force. Specifically, when increasing the rotational force transmitted between the clutch hub 21 and the clutch drum 22 by increasing the electric current supplied to the electric motor 31, the control unit 4 moves the piston 20 in the axial direction by temporarily supplying the electric motor 31 with the electric current having a first current value that is greater than a second current value corresponding to the target rotational force.

More specifically, the control unit 4 calculates a cumulative rotational amount of the electric motor 31 by cumulating the amount of rotation of the electric motor 31 from an initial state where the piston 20 is in the initial position. When increasing the rotational force transmitted between the clutch hub 21 and the clutch drum 22 by increasing the electric current supplied to the electric motor 31, the control unit 4 supplies the electric motor 31 with the electric current having the first current value greater than the second current value corresponding to the target rotational force until the cumulative rotational amount reaches a predetermined rotational amount that is less than a rotational amount corresponding to the target rotational force. Then, after the cumulative rotational amount reaches the predetermined rotational amount, the control unit 4 supplies the electric motor 31 with the electric current having the second current value corresponding to the target rotational force. The cumulative rotational amount of the electric motor 31, cumulated from the initial state, corresponding to the target rotational force is hereinafter referred to as a target cumulative rotational amount.

The memory device 41 stores clutch torque related information 412 that includes the relationship between the piston stroke and the clutch torque illustrated in FIG. 5. The clutch torque related information 412 is acquired by prior experiments or the like and is prestored in a nonvolatile memory, for example, in the form of a mapping table. The command current calculator 422 calculates the command current value by referring to the clutch torque related information 412.

Figure 7:
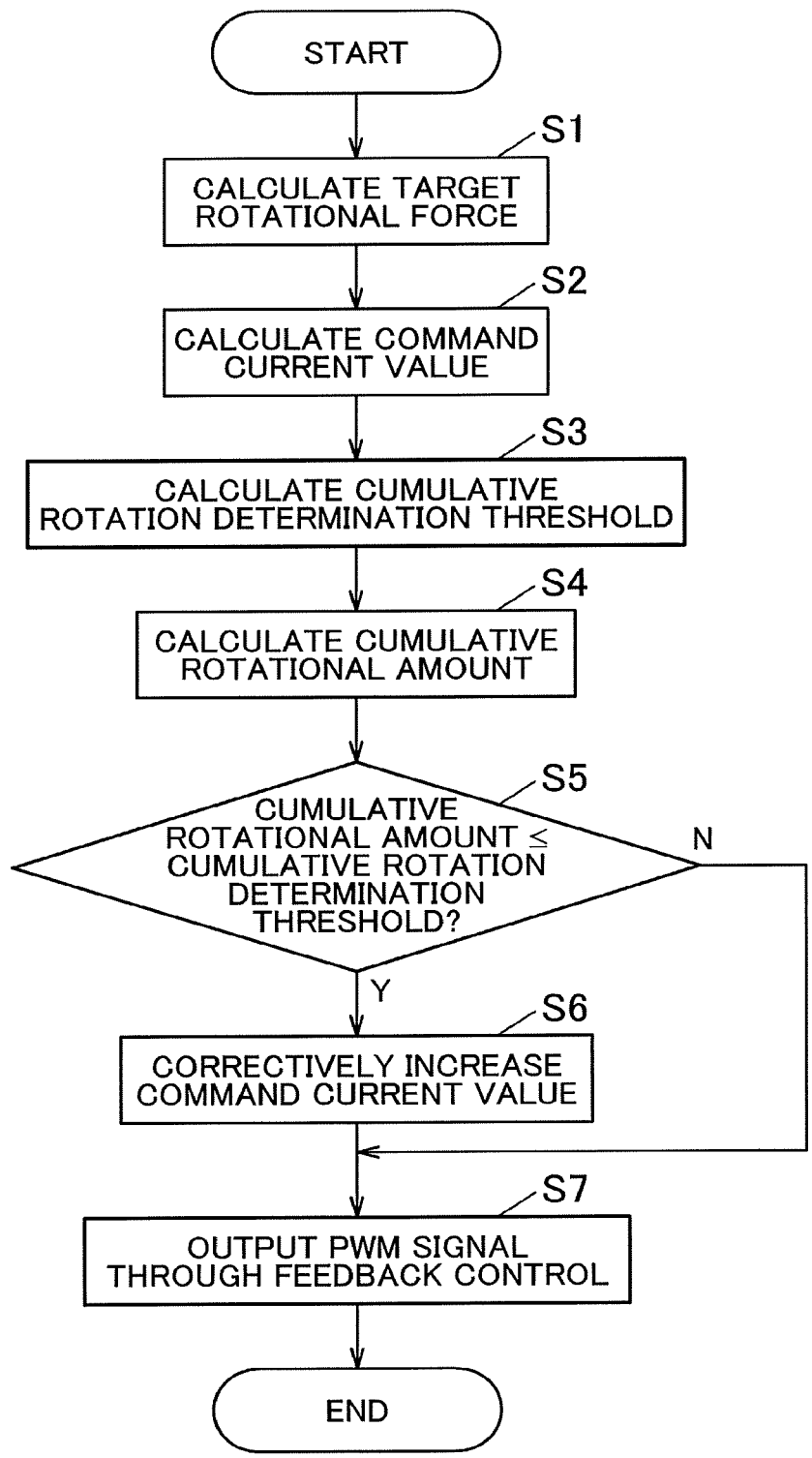
FIG. 7 is a flowchart illustrating a specific example of a process that is performed by a computing processor.

Next, a specific example of how to control the drive force transmission control apparatus 1 is described with reference to FIG. 7. FIG. 7 is a flowchart illustrating a specific example of a process that is performed by the computing processor 42. The process illustrated by the flowchart is performed when the drive mode of the four-wheel drive vehicle 100 switches from the two-wheel drive mode to the four-wheel drive mode. The computing processor 42 performs the process at predetermined control intervals.

In the process, the computing processor 42 first functions as the target rotational force calculator 421 and calculates the target rotational force on the basis of vehicle information (step S1). The vehicle information includes information about the traveling state of the four-wheel drive vehicle 100, such as the amount by which the accelerator pedal is depressed and the differential rotational speed of the front and rear wheels. The vehicle information may include a vehicle speed, a steering angle, the state of a switch that is operated by a driver, etc.

Then, the computing processor 42 calculates a command current value in accordance with the target rotational force calculated in step S1 (step S2). Continuously supplying electric current having the command current value calculated at step S2 causes the rotational force transmitted between the clutch hub 21 and the clutch drum 22 to become equal to the target rotational force.

Next, the computing processor 42 calculates a cumulative rotation determination threshold in accordance with the target rotational force calculated at step S1 (step S3). The cumulative rotation determination threshold corresponds to the predetermined rotational amount described above and is less than the target cumulative rotational amount. The target cumulative rotational amount is determined by referring to the clutch torque related information 412. For example, when the target rotational force is a value $T_1$ of the clutch torque on the vertical axis in FIG. 5, the target cumulative rotational amount corresponds to a value $P_2$ of the piston stroke. In this case, the cumulative rotation determination threshold corresponds to a value $P_3$ of the piston stroke that is less than the target cumulative rotational amount by a stroke width A illustrated in FIG. 5.

According to the first embodiment, the computing processor 42 sets the cumulative rotation determination threshold to a larger value as the target rotational force increases. Specifically, the cumulative rotation determination threshold is calculated, for example, by multiplying the target cumulative rotational amount by a predetermined factor (e.g., 0.8) that is less than one. In this case, the value $P_3$ is 80% of the value $P_2$. Alternatively, the cumulative rotation determination threshold may correspond to a value $P_1$ at which the clearances in the multi-plate clutch 23 are eliminated. Alternatively, the cumulative rotation determination threshold may be calculated by subtracting a predetermined amount (e.g., a half rotation) from the target cumulative rotational amount.

Then, the computing processor 42 calculates a cumulative rotational amount by cumulating the amount of rotation of the electric motor 31 from the state where the piston 20 is in the initial position (step S4). Specifically, the cumulative rotational amount is calculated by cumulatively counting the pulse signal output from the rotation amount sensor 312.

Next, the computing processor 42 determines whether or not the cumulative rotational amount calculated in step S4 is less than or equal to the cumulative rotation determination threshold calculated in step S3 (step S5). If it is determined that the cumulative rotational amount is less than or equal to the cumulative rotation determination threshold (S5: Yes), the computing processor 42 correctively increases the command current value calculated in step S2, thereby creating a new command current value that is greater than the command current value calculated in step S2 (step S6). For example, the new command current value may be created by multiplying the command current value calculated in step S2 by a predetermined factor that is greater than one, or may be created by adding a predetermined fixed value to the command current value calculated in step S2. In contrast, if the cumulative rotational amount is greater than the cumulative rotation determination threshold (S5: No), the computing processor 42 does not perform the procedure that increases the command current value calculated in step S2. The procedures of steps S2 to S6 are performed by the computing processor 42 functioning as the command current calculator 422.

Then, the computing processor 42 functioning as the feedback controller 423 performs feedback control to calculate a duty ratio that allows electric current having the command current value calculated through steps S2 to S6 to be supplied to the electric motor 31, and outputs a PWM signal with the duty ratio to the motor current output unit 43 (step S7).

Figure 8A:
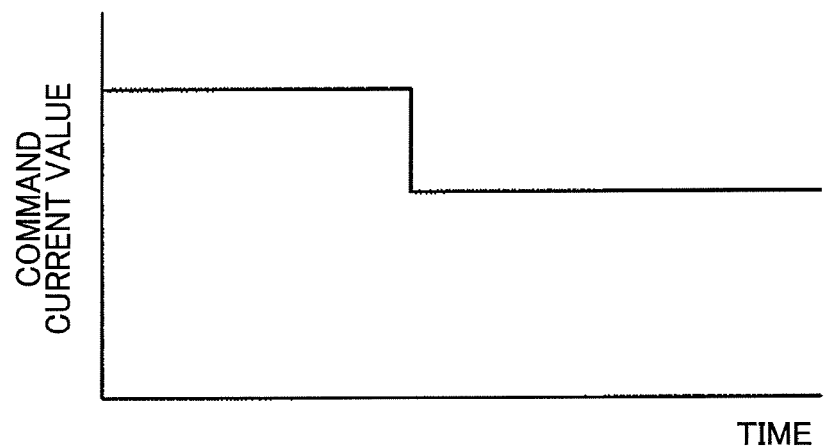
FIGS. 8A to 8D are graphs illustrating a state where a rotational force transmitted between rotating members is increased.
Figure 8B:
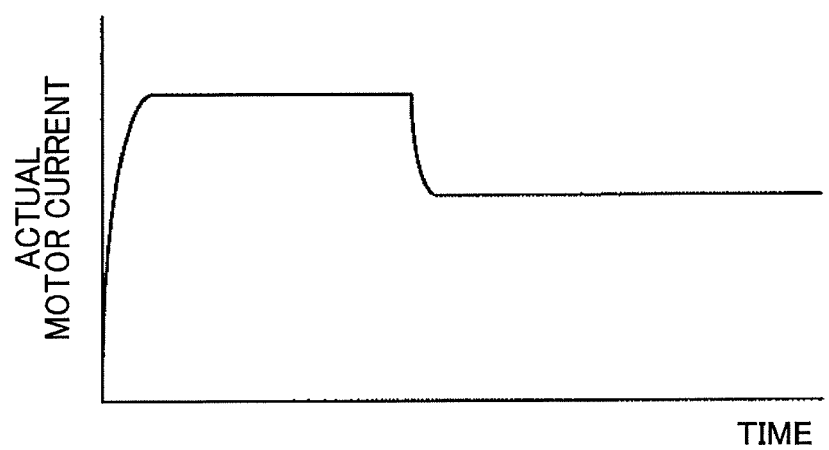
Figure 8C:
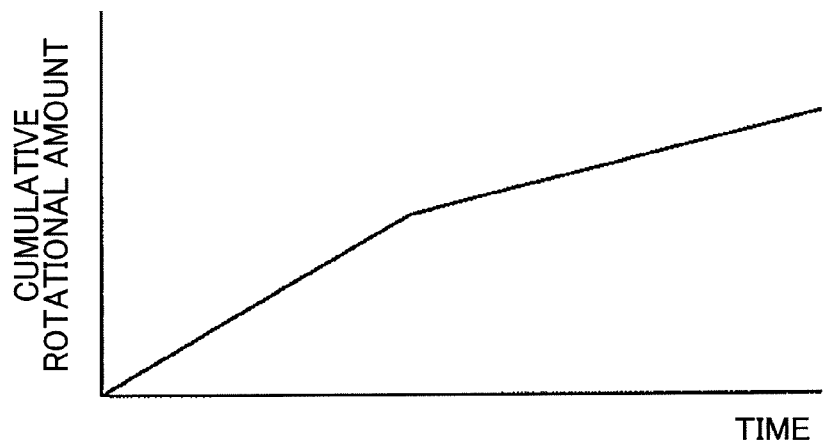
Figure 8D:
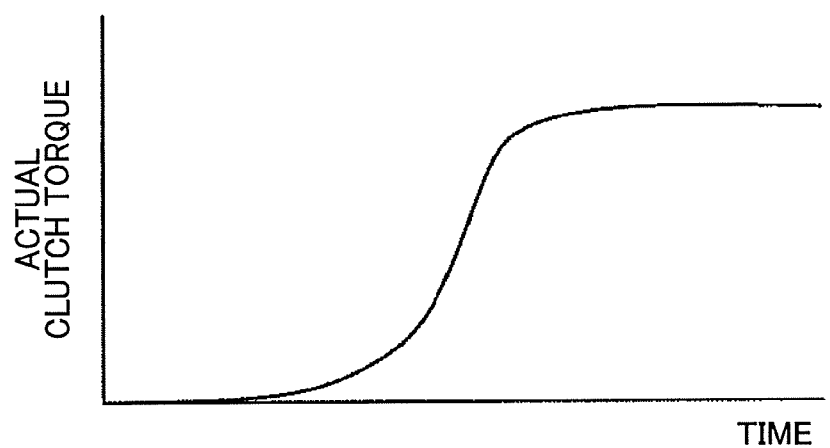
Figure 9A:
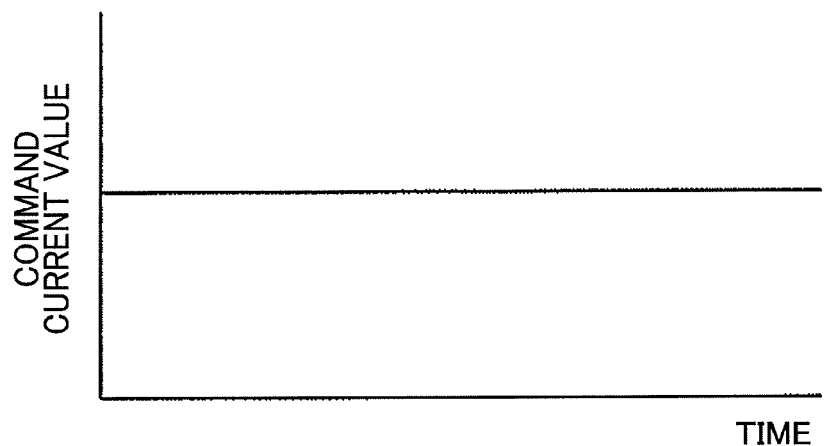
FIGS. 9A to 9D are graphs, according to a comparative example, illustrating a state where a rotational force transmitted between rotating members is increased.
Figure 9B:
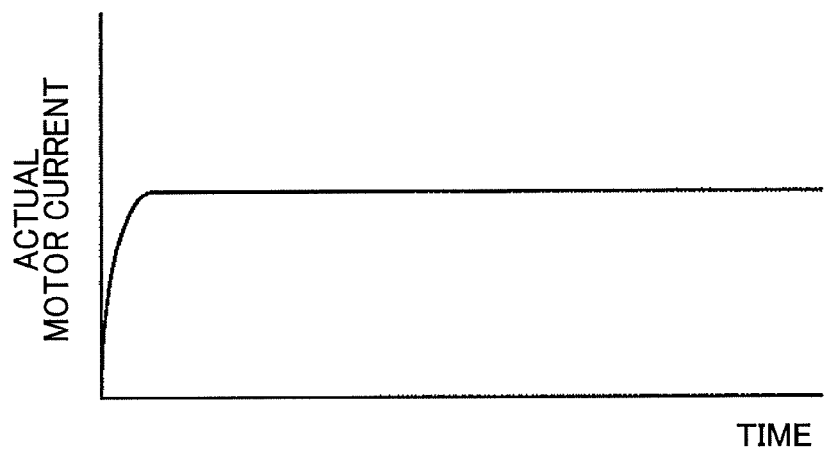
Figure 9C:
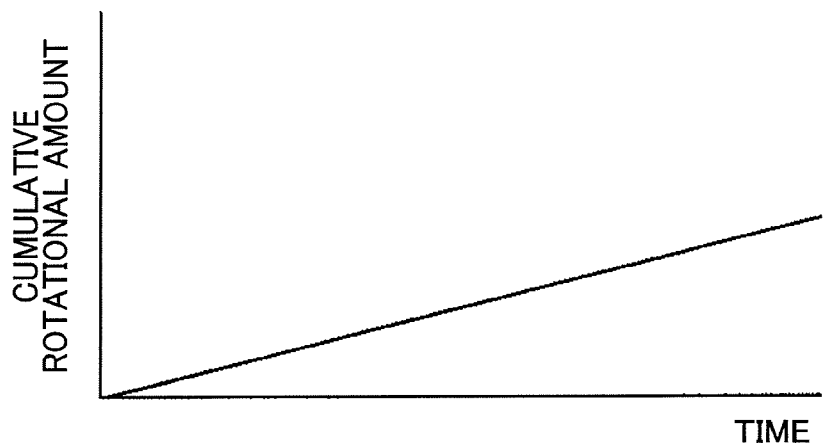
Figure 9D:
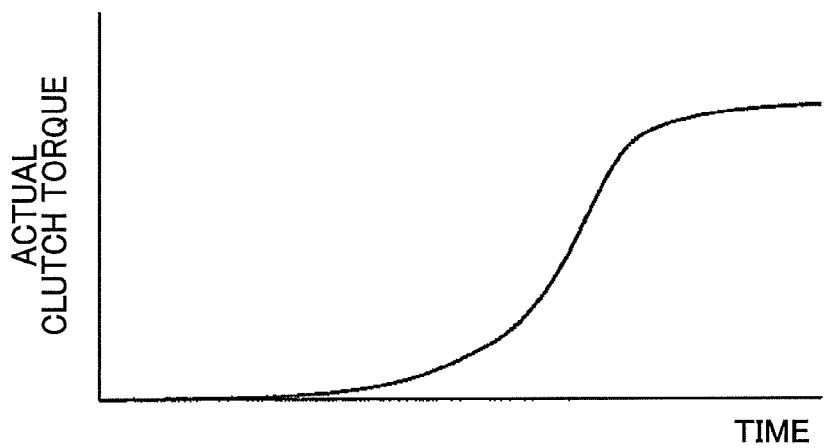

FIGS. 8A to 8D are graphs illustrating a state where the rotational force transmitted between the clutch hub 21 and the clutch drum 22 is increased by performing the procedure that moves the piston 20 quickly in the axial direction by temporarily supplying the electric motor 31 with the electric current having the first current value that is greater than the second current value corresponding to the target rotational force. In each of the graphs, the horizontal axis represents time. The vertical axis of the graph in FIG. 8A represents the command current value calculated through the procedures of steps S2 to S6. The vertical axis of the graph in FIG. 8B represents a value of electric current (actual motor current) actually supplied to the electric motor 31. The vertical axis of the graph in FIG. 8C represents the cumulative rotational amount calculated in step S4. The vertical axis of the graph in FIG. 8D represents actual clutch torque that is a rotational force actually transmitted between the clutch hub 21 and the clutch drum 22.

FIGS. 9A to 9D show a comparative example and are graphs illustrating how the physical quantities change when the procedures of steps S3 to S6 are not performed. The vertical and horizontal axes in FIGS. 9 to 9D respectively represent the same physical quantity as those in FIGS. 8A to 8D.

As can be seen by comparing FIGS. 8A to 8D with FIGS. 9A to 9D, when the command current value is correctively increased through the procedures of steps S5 and S6 in the flowchart of FIG. 7, the cumulative rotational amount is increased quickly, so that the actual clutch torque is increased quickly.

As described above, according to the first embodiment, when the rotational force transmitted between the clutch hub 21 and the clutch drum 22 is increased by increasing the electric current supplied to the electric motor 31, the piston 20 is moved in the axial direction by temporarily supplying the electric motor 31 with the electric current having the first current value greater than the second current value corresponding to the target rotational force. Thus, responsiveness when the drive force transmission control apparatus 1 operates is improved. This makes it possible to reduce drag torque of the multi-plate clutch 23 by increasing the widths of the clearances between the inner clutch plates 231 and the outer clutch plates 232 in the initial position of the piston 20, while allowing quick switching of the four-wheel drive vehicle 100 from the two-wheel drive mode to the four-wheel drive mode.

Further, after the piston 20 reaches a position corresponding to the value $P_3$ that is smaller than the value $P_2$ on the graph in FIG. 5, the control unit 4 supplies the electric motor 31 with the electric current having the second current value corresponding to the target rotational force. This feature reduces the likelihood of the piston 20 passing over a position corresponding to the value $P_2$ due to, for example, the rotational inertia of the electric motor 31 and the hydraulic pump 32, thus suppressing overshoot of the rotational force that is transmitted between the clutch hub 21 and the clutch drum 22 through the multi-plate clutch 23.

Furthermore, the control unit 4 sets the cumulative rotation determination threshold to a larger value as the target rotational force increases. This feature makes it possible to set a difference between the target cumulative rotational amount and the cumulative rotation determination threshold to an appropriate value in accordance with the target rotational force, thus reliably suppressing the overshoot of the rotational force and improving the responsiveness of the drive force transmission control apparatus 1.

Figure 10:
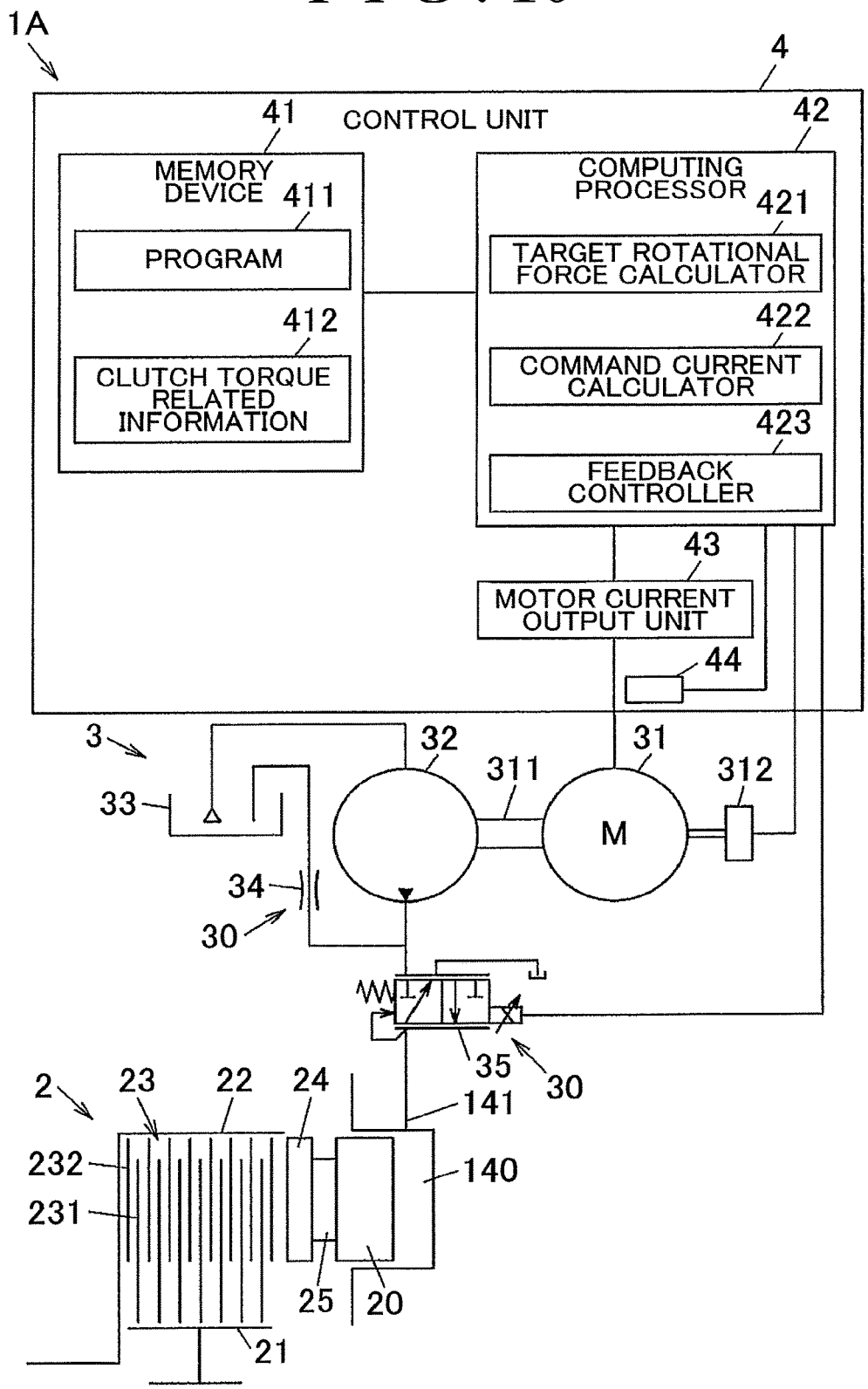
FIG. 10 is a schematic diagram illustrating the structure of a drive force transmission control apparatus according to a modification of the first embodiment.

FIG. 10 is a schematic diagram illustrating the structure of a drive force transmission control apparatus 1A according to a modification of the first embodiment. A clutch unit 2 and a control unit 4 of the drive force transmission control apparatus 1A have the same structure as the clutch unit 2 and the control unit 4 described in the first embodiment. In contrast, a hydraulic unit 3A of the drive force transmission control apparatus 1A differs in structure from the hydraulic unit 3 described in the first embodiment. Specifically, the hydraulic unit 3A includes a control valve 35 in addition to the electric motor 31, the hydraulic pump 32, and the fixed throttle valve 34. The degree of opening of the control valve 35 changes in accordance with electric current supplied from the control unit 4. The hydraulic pump 32, the fixed throttle valve 34, and the control valve 35 form a moving mechanism 30A.

The control valve 35 is located between the hydraulic pump 32 and the cylinder chamber 140 and adjusts the pressure of hydraulic oil that is supplied from the hydraulic pump 32 to the cylinder chamber 140. The control valve 35 allows more accurate control of a drive force that is transmitted to the rear wheels 105R and 105L when the four-wheel drive vehicle 100 travels in the four-wheel drive mode. While supplying the electric motor 31 with the electric current having a greater current value during a transition from the two-wheel drive mode to the four-wheel drive mode, the control unit 4 sets the degree of opening of the control valve 35 to a first degree that is greater than a second degree corresponding to the target rotational force. This feature facilitates quick movement of the piston 20 when the electric motor 31 is supplied with the electric current having the current value greater than the current value corresponding to the target rotational force.

The modification described above has the same advantages as the first embodiment.

Next, a second embodiment of the invention is described with reference to FIGS. 11 to 15. The second embodiment differs from the first embodiment in the structure of a drive force transmission system 101 of a four-wheel drive vehicle 100 and in the structure of a drive force transmission control apparatus 1B as a clutch apparatus.

Figure 11:
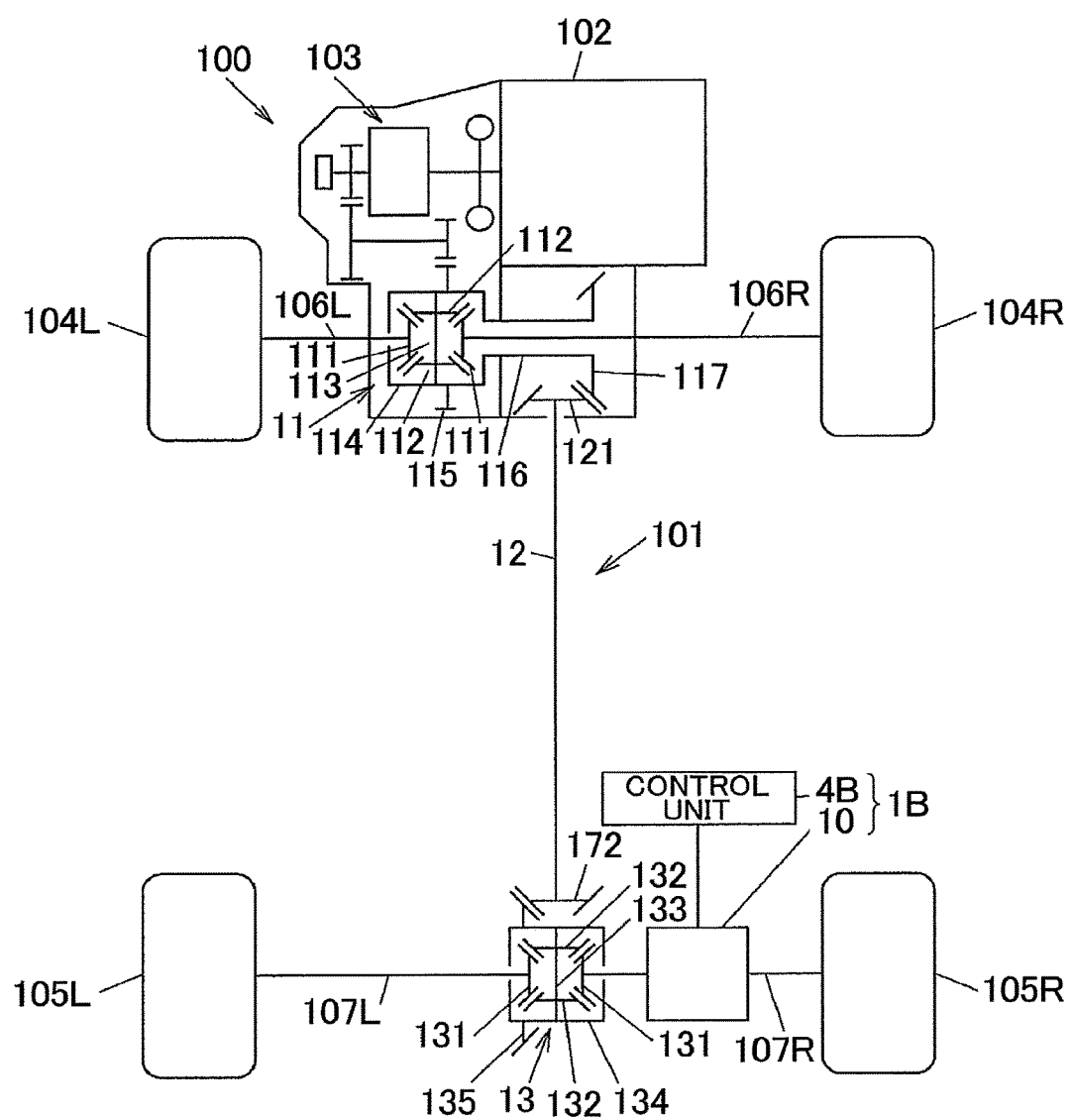
FIG. 11 is a schematic diagram illustrating the structure of a four-wheel drive vehicle according to a second embodiment.

FIG. 11 is a schematic diagram illustrating the structure of the four-wheel drive vehicle 100 according to the second embodiment of the invention. In FIG. 11, the structures common to the first and second embodiments are denoted by the same reference symbols as those used in the first embodiment, and the already described features of the common structures are not described in the second embodiment.

According to the first embodiment, the clutch unit 2 is located between the drive shaft 107L and the left one of the pair of side gears 131 of the rear differential 13. In contrast, according to the second embodiment, a drive force transmission device 10 is located between the drive shaft 107R and the right one of the pair of side gears 131. The drive force transmission device 10 and a control unit 4B that controls the drive force transmission device 10 form the drive force transmission control apparatus 1B.

Figure 12:
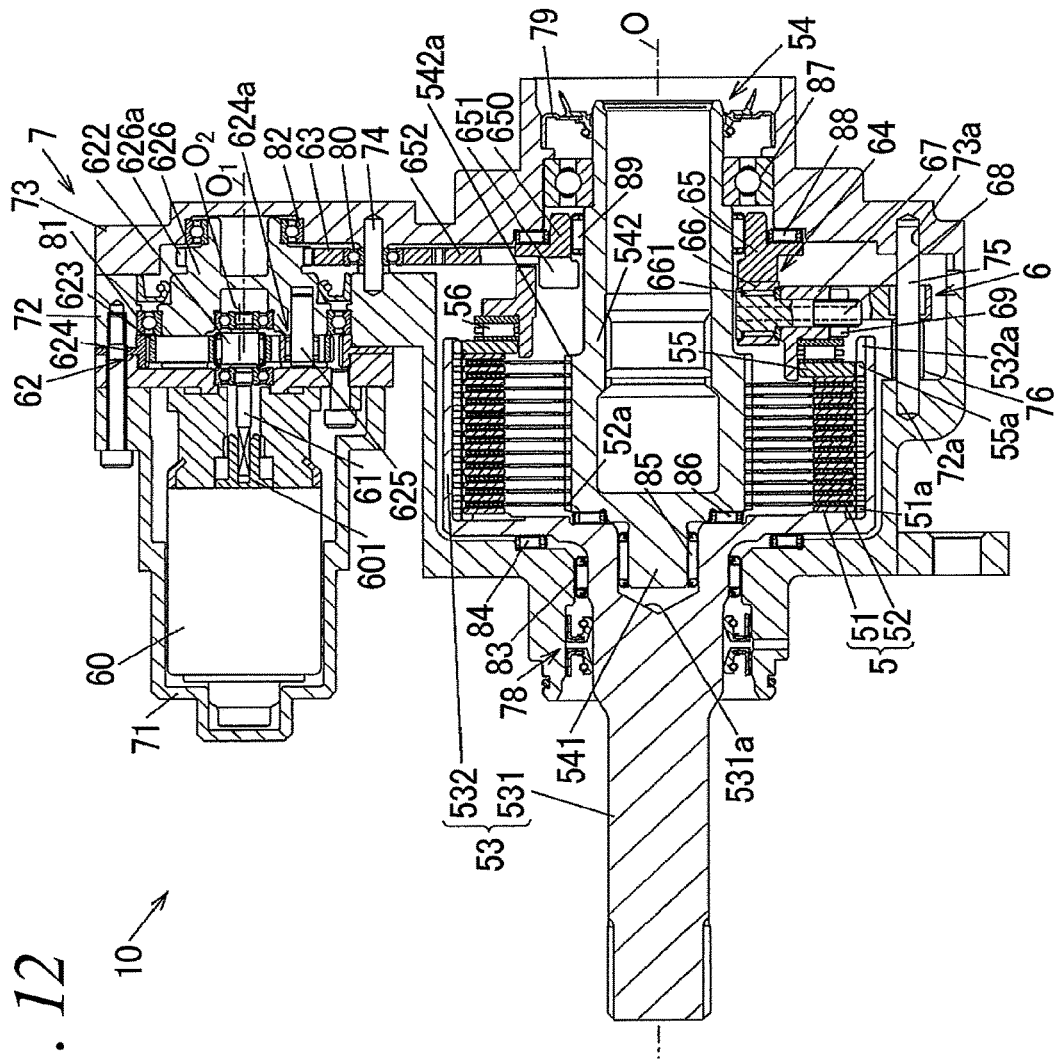
FIG. 12 is a cross-sectional view illustrating the structure of a drive force transmission device.

FIG. 12 is a cross-sectional view illustrating the structure of the drive force transmission device 10. In FIG. 12, an upper area above the rotation axis O illustrates the drive force transmission device 10 in a non-operating state, and a lower area below the rotation axis O illustrates the drive force transmission device 10 in an operating state.

The drive force transmission device 10 includes the following: a multi-plate clutch 5 having multiple outer clutch plates 51 and inner clutch plates 52 that respectively serve as first and second clutch plates and that are aligned in the axial direction; a clutch drum 53 and a clutch hub 54 that serve as first and second rotating members and that are rotatable relative to each other on the same axis of rotation; a pressing member 55 that presses the multi-plate clutch 5; an electric motor 60 that generates torque in accordance with electric current supplied from the control unit 4B; a moving mechanism 6 that moves the pressing member 55 in the axial direction in accordance with the amount of rotation of the electric motor 60; a housing 7 that houses the multi-plate clutch 5, the electric motor 60, and the moving mechanism 6; sealing members 78 and 79 that seals the housing 7 to retain lubricating oil (not illustrated) in the housing 7; and bearings 80 to 89 that allow smooth rotation of each member.

The moving mechanism 6 includes the following: a drive shaft 61 coupled to a rotor 601 of the electric motor 60 such that the drive shaft 61 is not rotatable relative to the rotor 601; a speed reducer 62 that reduces the speed of a rotational output of the drive shaft 61; a counter gear 63 that transmits an output of the speed reducer 62; and a cam mechanism 64 that receives the rotational force of the electric motor 60 through the speed reducer 62 and the counter gear 63, thereby generating a pressing force that presses the multi-plate clutch 5.

The housing 7 includes first, second, and third housing members 71, 72, and 73. The first housing member 71 houses the electric motor 60. The second and third housing members 72 and 73 house the multi-plate clutch 5 and the moving mechanism 6. The counter gear 63 is supported by the bearing 80 on a supporting shaft 74 that is supported between the second and third housing members 72 and 73. The lubricating oil (not illustrated) is enclosed in the housing 7.

According to the second embodiment, the speed reducer 62 is an involute speed reducer and includes the following: an eccentric member 622 having a central axis $O_2$ that is eccentric by a predetermined amount with respect to an axis $O_1$ of the drive shaft 61; an input member 623 formed as an external gear and having a central hole that holds the eccentric member 622; a rotational force applying member 624 formed as an internal gear and having a central axis that coincides with the axis $O_1$; multiple shaft members 625 held via bearings in a holding hole 624a formed in the rotational force applying member 624; and an output member 626 that rotates by receiving, through the shaft members 625, the rotational force applied by the rotational force applying member 624 to the input member 623. The output member 626 is rotatably supported by the bearings 81 and 82 and has a gear portion 626a that meshes with the counter gear 63.

The clutch drum 53 integrally includes a shaft portion 531 and a bottomed cylindrical portion 532. The shaft portion 531 of the clutch drum 53 is splined to the right side gear 131 of the rear differential 13 and thus is not rotatable relative to the right side gear 131. The bearings 83 and 84 and the sealing member 78 are located between the clutch drum 53 and the first housing member 71.

The clutch hub 54 integrally includes a shaft-shaped boss portion 541 and a bottomed cylindrical portion 542. The axis of the boss portion 541 coincides with the rotation axis O. The boss portion 541 is held by the bearing 85 in a recess 531a that is formed in the shaft portion 531 of the clutch drum 53. A portion of the cylindrical portion 542 that is located closer to the boss portion 541 is partially housed in the cylindrical portion 532 of the clutch drum 53. The bearing 86 is located between the clutch drum 53 and an axial end surface of the cylindrical portion 542 that is located closer to the boss portion 541. The bearing 87 and the sealing member 79 are located between the third housing member 73 and an end of the cylindrical portion 542 that is located farther from the boss portion 541.

The multi-plate clutch 5 is located between the cylindrical portion 532 of the clutch drum 53 and the cylindrical portion 542 of the clutch hub 54. The cylindrical portion 532 of the clutch drum 53 has an inner circumferential surface provided with straight spline fit portions 532a that are engaged with multiple projections 51a of the outer clutch plates 51. The cylindrical portion 542 of the clutch hub 54 has an outer circumferential surface provided with straight spline fit portions 542a that are engaged with multiple projections 52a of the inner clutch plates 52. The outer clutch plates 51 are movable in the axial direction relative to the clutch drum 53 and are not rotatable relative to the clutch drum 53. The inner clutch plates 52 are movable in the axial direction relative to the clutch hub 54 and are not rotatable relative to the clutch hub 54.

The pressing member 55 has an annular shape and presses the multi-plate clutch 5 in the axial direction, thereby bringing the outer clutch plates 51 and the inner clutch plates 52 into frictional contact with each other. As in the inner clutch plates 231 according to the first embodiment, each of the inner clutch plates 52 includes an annular base formed from a metal plate, and a friction member bonded on each side of the base. As in the outer clutch plates 232 according to the first embodiment, each of the outer clutch plates 51 is an annular metal plate. The pressing member 55 has an outer circumferential surface provided with multiple projections 551 that are engaged with the straight spline fit portions 532a of the clutch drum 53. Thus, the pressing member 55 is movable in the axial direction relative to the clutch drum 53 and is not rotatable relative to the clutch drum 53.

Multiple (three in this example) guide members 75 that are used to operate the cam mechanism 64 are located radially outside the clutch drum 53 and are located between the second housing member 72 and the third housing member 73. The guide members 75 are arranged parallel to the rotation axis O. One of the guide members 75 is illustrated in FIG. 12. Each of the guide members 75 is shaped like a solid cylinder, has a first axial end that is fitted and fixed in a holding hole 72a formed in the second housing member 72, and a second axial end that is fitted and fixed in a holding hole 73a formed in the third housing member 73. A return spring 76 fits over each of the guide members 75. The return spring 76 serves as a biasing member and biases a second cam member 67 of the cam mechanism 64 in the axial direction, as described later. The return spring 76 is a coil spring and is located between the second housing member 72 and the second cam member 67 while being compressed in the axial direction. Thus, the return spring 76 exerts a restoring force that elastically presses the second cam member 67 against the third housing member 73.

Figure 13:
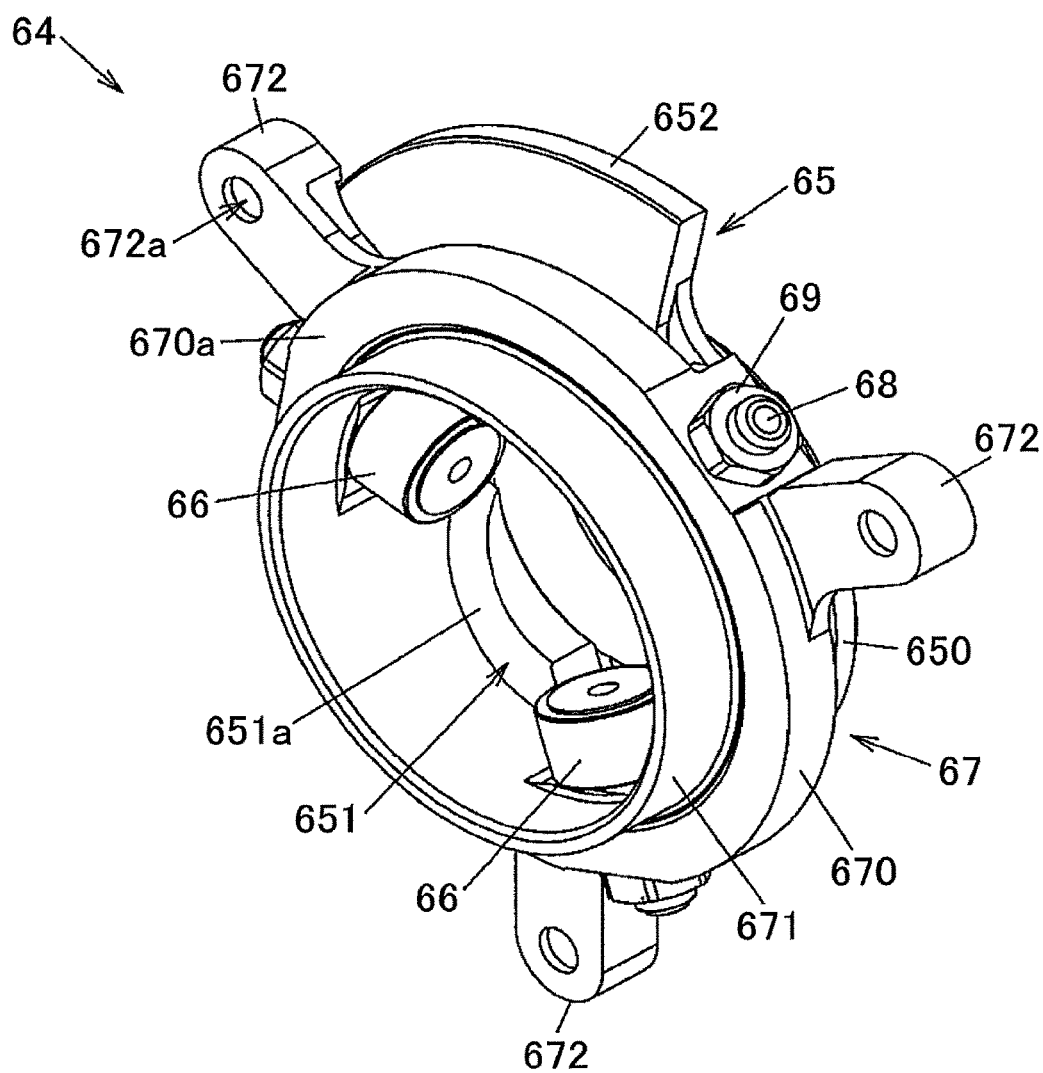
FIG. 13 is a perspective view illustrating a cam mechanism of the drive force transmission device.

FIG. 13 is a perspective view illustrating an example of the structure of the cam mechanism 64. The cam mechanism 64 includes the following: a first cam member 65 having a cam surface 651a that is inclined with respect to the rotation axis O; multiple (three in this example) rolling members 66 that roll on the cam surface 651a; the second cam member 67 that has an annular shape and that outputs, to the multi-plate clutch 5, a thrust force generated by the rolling of the rolling members 66; and supporting pins 68 that support the rolling members 66 such that the rolling members 66 are rollable. The second cam member 67 is located closer to the multi-plate clutch 5 than the first cam member 65. The rolling members 66 are located within the second cam member 67.

The first cam member 65 has an annular shape so that the clutch hub 54 is inserted through the first cam member 65. The first cam member 65 integrally includes the following: a base 650 that has an annular plate shape with a predetermined thickness in the direction of the rotation axis O; multiple (three in this example) arc-shaped protrusions 651 that protrude from a side surface of the base 650 toward the multi-plate clutch 5; a fan-shaped gear portion 652 that protrudes outward from a part of the outer circumferential surface of the base 650. The bearing 88 (refer to FIG. 12) is located between the base 650 and the third housing member 73. The bearing 89 is located between the base 650 and the clutch hub 54.

An axial end surface of each of the protrusions 651 of the first cam member 65 that faces toward the multi-plate clutch 5 serves as the cam surface 651a. The rolling members 66 roll on the cam surface 651a while moving together with the second cam member 67 along the rotation axis O. An outer circumferential surface of the gear portion 652 has gear teeth that mesh with the counter gear 63. FIG. 13 omits the illustration of the gear teeth.

The second cam member 67 integrally includes the following: a retainer base 670 that has an annular plate shape with a predetermined thickness in the direction of the rotation axis O; a cylindrical tube portion 671 that extends from an end surface of the retainer base 670 that faces toward the multi-plate clutch 5; and multiple (three in this example) protruding pieces 672 that protrude outward from different parts of the outer circumferential surface of the retainer base 670.

The retainer base 670 has multiple (three in this example) pin insertion holes that are arranged in a radial manner. The supporting pins 68 are inserted through the pin insertion holes. Each of the supporting pins 68 has an external thread portion that protrudes radially outward from the retainer base 670 and that is threadedly engaged with a nut 69. As such, the supporting pins 68 are fixed to the second cam member 67. Each of the rolling members 66 is supported by a needle roller bearing 661 (refer to FIG. 12) to an end of a corresponding one of the supporting pins 68.

Each of the protruding pieces 672 of the second cam member 67 has a guide insertion hole 672a through which a corresponding one of the guide members 75 is inserted. The insertion of the guide members 75 through the guide insertion holes 672a does not allow relative rotation between the second cam member 67 and the housing 7 and allows relative movement between the second cam member 67 and the housing 7 in the axial direction. An end surface of the protruding piece 672 around the guide insertion hole 672a serves to receive a pressing force exerted by the return spring 76.

The pressing member 55 and a needle roller bearing 56 (refer to FIG. 12) are located radially outside the tube portion 671 of the second cam member 67. The needle roller bearing 56 is located between the pressing member 55 and an axial end surface 670a of the retainer base 670. The rotation of the electric motor 60 causes relative rotation between the first cam member 65 and the second cam member 67 of the cam mechanism 64, and the relative rotation between the first cam member 65 and the second cam member 67 generates a cam thrust force in the axial direction.

Specifically, when the control unit 4B supplies motor current to the electric motor 60, the electric motor 60 rotates accordingly. The rotational output of the electric motor 60 is reduced in speed by the speed reducer 62 and then is transmitted through the counter gear 63 to the first cam member 65 of the cam mechanism 64. Then, when the first cam member 65 rotates, the rolling members 66 roll on the cam surface 651a of the protrusions 651, and the second cam member 67 moves in the axial direction along the rotation axis O while being guided by the guide members 75. The cam thrust force of the cam mechanism 64 causes the pressing member 55 to press the multi-plate clutch 5.

Figure 14:
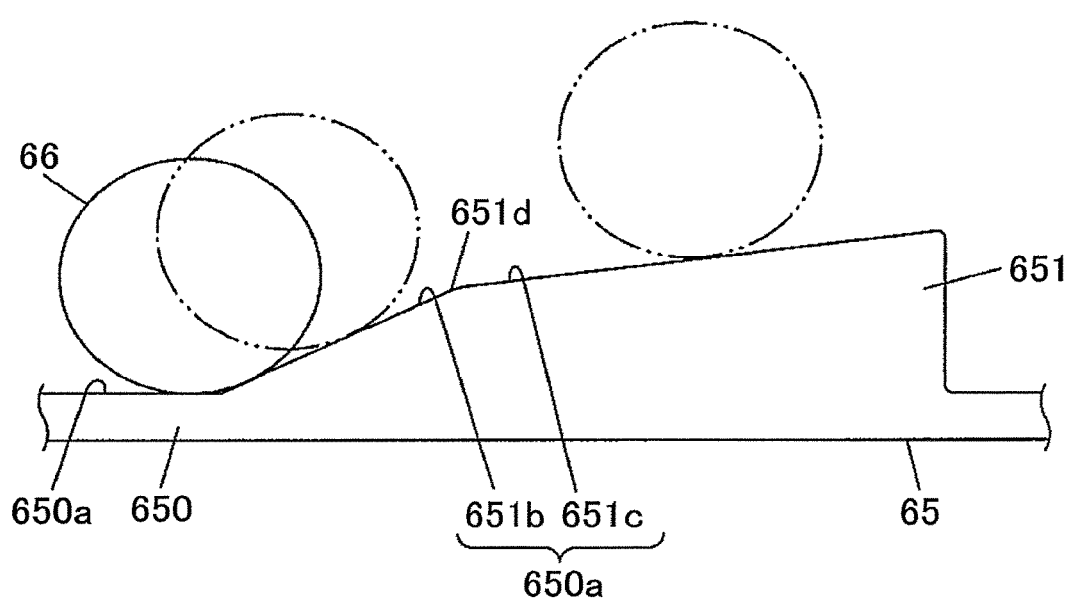
FIG. 14 is a schematic diagram illustrating one of three protrusions of a first cam member and its surrounding area, along with a rolling member, as seen along the circumferential direction of the first cam member.

FIG. 14 is a schematic diagram illustrating one of the three protrusions 651 and its surrounding area, along with the rolling member 66, as seen along the circumferential direction of the first cam member 65. The cam surface 651a of the protrusion 651 includes a first cam surface 651b with a large gradient and a second cam surface 651c with a small gradient. The first cam surface 651b and the second cam surface 651c are smoothly connected together at a boundary 651d. The lateral direction in FIG. 14 corresponds to the circumferential direction of the first cam member 65.

When the drive force transmission device 10 is not operating, the rolling member 66 abuts with an axial end surface 650a of the base 650 of the first cam member 65. When the rolling member 66 abuts with the axial end surface 650a of the base 650 of the first cam member 65, the pressing member 55 is positioned closest to the third housing member 73 (farthest from the multi-plate clutch 5). The position of the pressing member 55 at this time is hereinafter referred to as an initial position of the pressing member 55. In an initial state where the pressing member 55 is in the initial position, there are clearances between the outer clutch plates 51 and the inner clutch plates 52 so that the clutch drum 53 and the clutch hub 54 rotate relative to each other.

When the electric motor 60 rotates from the initial state, the first cam member 65 rotates relative to the second cam member 67, and the rolling member 66 rolls on the first cam surface 651b. Accordingly, the pressing member 55 moves toward the multi-plate clutch 5 so that the clearances between the outer clutch plates 51 and the inner clutch plates 52 are reduced. Then, when the rolling member 66 reaches the boundary 651d, all the clearances between the outer clutch plates 51 and the inner clutch plates 52 are eliminated.

When the electric motor 60 further rotates from this state, the rolling member 66 rolls on the second cam surface 651c so that the outer clutch plates 51 and the inner clutch plates 52 are pressed against each other by the pressing member 55. This exerts a frictional force between the outer clutch plates 51 and the inner clutch plates 52, and the frictional force transmits a rotational force between the clutch drum 53 and the clutch hub 54. In FIG. 14, the rolling member 66 rolling on the first cam surface 651b and the rolling member 66 rolling on the second cam surface 651c are each represented by a long dashed double-short dashed line.

The rotational force transmitted between the clutch drum 53 and the clutch hub 54 increases with an increase in the displacement of the rolling member 66 from its initial position. By controlling the electric motor 60, the control unit 4B adjusts the rotational force that is transmitted between the clutch drum 53 and the clutch hub 54 through the multi-plate clutch 5.

The control unit 4B has the same structure as the control unit 4 that is described in the first embodiment with reference to FIG. 6. Specifically, the control unit 4B includes the memory device 41, the computing processor 42, the motor current output unit 43, and the current sensor 44. The memory device 41 stores the program 411 and the clutch torque related information 412. By executing the program 411, the computing processor 42 functions as the target rotational force calculator 421, the command current calculator 422, and the feedback controller 423.

The clutch torque related information 412 includes the relationship between the amount of movement of the pressing member 55 from the initial position and the rotational force that is transmitted between the clutch drum 53 and the clutch hub 54 through the multi-plate clutch 5. The target rotational force calculator 421, the command current calculator 422, and the feedback controller 423 perform the same control procedures as those described in the first embodiment.

Figure 15:
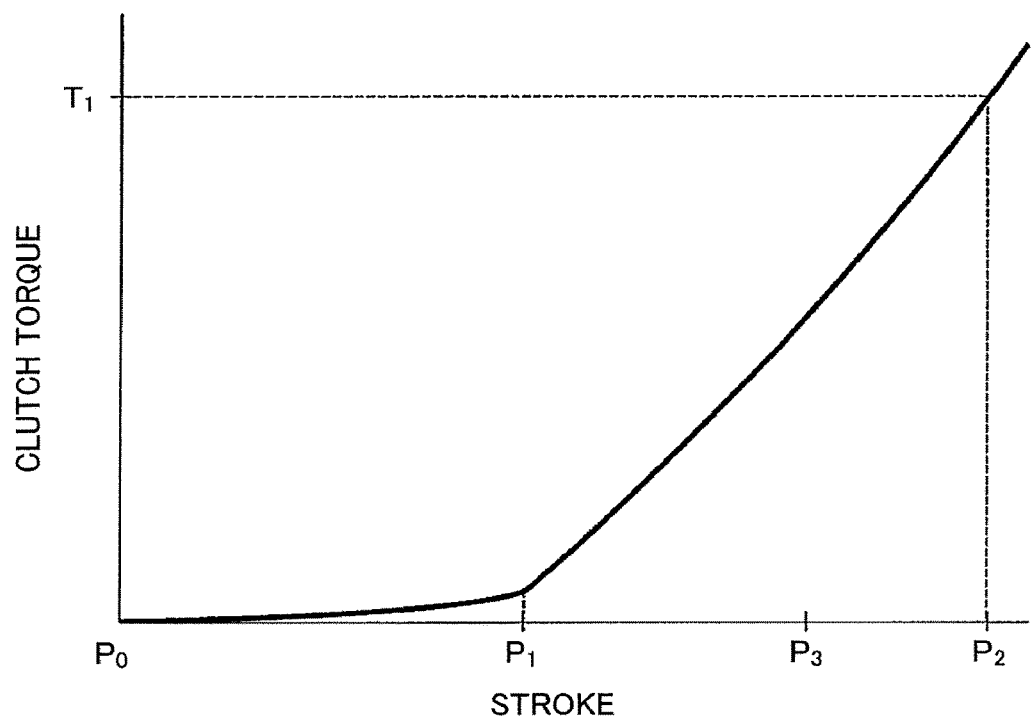
FIG. 15 is a graph illustrating an example of the relationship between the amount of movement of a pressing member from its initial position and a rotational force transmitted through a multi-plate clutch.

FIG. 15 is a graph illustrating an example of the relationship between the amount of movement (a stroke) of the pressing member 55 from its initial position and the rotational force (clutch torque) that is transmitted between the clutch drum 53 and the clutch hub 54 through the multi-plate clutch 5. The relationship between the stroke and the clutch torque is determined by prior experiments and is prestored in the memory device 41.

In this graph, a value $P_0$ on the horizontal axis that represents the stroke corresponds to the initial position of the pressing member 55, and a value $P_1$ corresponds to a position of the pressing member 55 when the outer circumferential surface of the rolling member 66 is in contact with the boundary 651d. The clutch torque gradually changes when the stroke is less than or equal to the value $P_1$ and sharply increases when the stroke exceeds the value $P_1$. For example, when the target rotational force is a value $T_1$ of the clutch torque on the vertical axis in FIG. 15, the target cumulative rotational amount corresponds to a value $P_2$ of the stroke, and the cumulative rotation determination threshold corresponds to a value $P_3$ of the stroke that is smaller than the value $P_2$ corresponding to the target cumulative rotational amount.

The second embodiment has the same advantages as the first embodiment. In addition, since the cam surface 651a of the first cam member 65 has the first cam surface 651b with a large gradient and the second cam surface 651c with a small gradient, the pressing member 55 moves toward the multi-plate clutch 5 more quickly when the rolling member 66 rolls on the first cam surface 651b. This feature reduces the time required to complete elimination of the clearances in the multi-plate clutch 5, thus further improving the responsiveness of the drive force transmission control apparatus 1B.

The embodiments described above may be modified in various ways within the scope of the invention. For example, although the embodiments take an internal-combustion engine as an example of a drive source, the drive source may be an electric motor or a combination of an engine and an electric motor. Although the embodiments describe that a clutch apparatus according to the invention is used in a drive force transmission system of four-wheel drive vehicles, the clutch apparatus has various other uses and may be used in, for example, machine tools.

What is claimed is:
1. A clutch apparatus comprising:
   a first rotating member and a second rotating member that share an axis of rotation and that are rotatable relative to each other about the axis;
   a multi-plate clutch having a first clutch plate that rotates together with the first rotating member, the multi-plate clutch further having a second clutch plate that is aligned with the first clutch plate in an axial direction and that rotates together with the second rotating member;
   a pressing member that presses the multi-plate clutch;
   an electric motor that is supplied with electric current and that generates torque in accordance with the electric current;

a moving mechanism that moves the pressing member in the axial direction in accordance with an amount of rotation of the electric motor; and a control unit that controls the electric motor, wherein the clutch apparatus allows adjustment of a rotational force that is transmitted between the first rotating member and the second rotating member through the multi-plate clutch, and when increasing the rotational force transmitted between the first rotating member and the second rotating member by increasing the electric current supplied to the electric motor, the control unit moves the pressing member in the axial direction by temporarily supplying the electric motor with the electric current having a first current value that is greater than a second current value corresponding to a target rotational force that needs to be transmitted between the first rotating member and the second rotating member.

2. The clutch apparatus according to claim 1, wherein
the control unit calculates a cumulative rotational amount of the electric motor by cumulating an amount of rotation of the electric motor from an initial state where the pressing member is positioned with a distance between the multi-plate clutch, when increasing the rotational force transmitted between the first rotating member and the second rotating member by increasing the electric current supplied to the electric motor, the control unit supplies the electric motor with the electric current having the first current value greater than the second current value corresponding to the target rotational force until the cumulative rotational amount reaches a predetermined rotational amount that is less than a rotational amount corresponding to the target rotational force, and after the cumulative rotational amount reaches the predetermined rotational amount, the control unit supplies the electric motor with the electric current having the second current value corresponding to the target rotational force.

3. The clutch apparatus according to claim 2, wherein
the control unit sets the predetermined rotational amount to a larger value as the target rotational force increases.

4. The clutch apparatus according to claim 1, wherein
the moving mechanism includes a pump that discharges a hydraulic fluid by being driven by the electric motor, and the moving mechanism moves the pressing member toward the multi-plate clutch by pressure in a cylinder chamber that is supplied with the hydraulic fluid.

5. The clutch apparatus according to claim 4, wherein
the moving mechanism further includes a control valve located between the pump and the cylinder chamber, a degree of opening of the control valve changes in accordance with electric current supplied from the control unit, and the control unit sets the degree of opening of the control valve to a first degree that is greater than a second degree corresponding to the target rotational force, while supplying the electric motor with the electric current having the first current value greater than the second current value corresponding to the target rotational force.

6. The clutch apparatus according to claim 1, wherein
the moving mechanism includes a cam mechanism, the cam mechanism includes a first cam member and a second cam member, and generates an axial thrust force by relative rotation between the first cam member and the second cam member, and the rotation of the electric motor causes the relative rotation between the first cam member and the second cam member.

7. A method for controlling a clutch apparatus, the clutch apparatus including:
a first rotating member and a second rotating member that share an axis of rotation and that are rotatable relative to each other about the axis;

a multi-plate clutch having a first clutch plate that rotates together with the first rotating member, the multi-plate clutch further having a second clutch plate that is aligned with the first clutch plate in an axial direction and that rotates together with the second rotating member;

a pressing member that presses the multi-plate clutch;

an electric motor that is supplied with electric current and that generates torque in accordance with the electric current; and a moving mechanism that moves the pressing member in the axial direction in accordance with an amount of rotation of the electric motor, the clutch apparatus configured to allow adjustment of a rotational force that is transmitted between the first rotating member and the second rotating member through the multi-plate clutch, the method comprising:

when increasing the rotational force transmitted between the first rotating member and the second rotating member by increasing the electric current supplied to the electric motor, moving the pressing member in the axial direction by temporarily supplying the electric motor with the electric current having a first current value that is greater than a second current value corresponding to a target rotational force that needs to be transmitted between the first rotating member and the second rotating member.

* * * * *

UNITED STATES PATENT AND TRADEMARK OFFICE
CERTIFICATE OF CORRECTION

PATENT NO.         : 10,480,597 B2  
APPLICATION NO.    : 16/001348  
DATED              : November 19, 2019  
INVENTOR(S)        : Tomohiro Nozu et al.

Page 1 of 1

It is certified that error appears in the above-identified patent and that said Letters Patent is hereby corrected as shown below:

On the Title Page

Item (30), should read:  
-- Jun. 12, 2017 (JP)....................2017-114904 --

Signed and Sealed this  
Seventh Day of January, 2020

Andrei Iancu  
*Director of the United States Patent and Trademark Office*